United States Patent
Kim et al.

(10) Patent No.: US 12,541,931 B2
(45) Date of Patent: Feb. 3, 2026

(54) SYSTEM AND METHOD FOR PROVIDING WEATHER EFFECT IN IMAGE

(71) Applicant: SAMSUNG ELECTRONICS CO., LTD., Suwon-si (KR)

(72) Inventors: Gyehyun Kim, Suwon-si (KR); Yoonhee Choi, Suwon-si (KR); Keunjoo Kwon, Suwon-si (KR); Beomseok Kim, Suwon-si (KR); Sangwon Lee, Suwon-si (KR); Youjin Lee, Suwon-si (KR); Taeyoung Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/456,823

(22) Filed: Aug. 28, 2023

(65) Prior Publication Data
US 2023/0410446 A1    Dec. 21, 2023

Related U.S. Application Data

(63) Continuation of application No. 17/717,937, filed on Apr. 11, 2022, now Pat. No. 11,776,224, which is a
(Continued)

(30) Foreign Application Priority Data

| Feb. 18, 2019 | (KR) | 10-2019-0018823 |
| Jun. 24, 2019 | (KR) | 10-2019-0075228 |
| Oct. 2, 2019  | (KR) | 10-2019-0122660 |

(51) Int. Cl.
*G06T 19/00* (2011.01)
*G06T 7/50* (2017.01)
(Continued)

(52) U.S. Cl.
CPC .............. *G06T 19/006* (2013.01); *G06T 7/50* (2017.01); *G06T 11/001* (2013.01); *G06T 11/60* (2013.01);
(Continued)

(58) Field of Classification Search
CPC ....... G06T 11/001; G06T 11/60; G06T 13/60; G06T 15/04; G06T 19/006
See application file for complete search history.

(56) References Cited

U.S. PATENT DOCUMENTS

| 7,043,368 B1 | 5/2006 | Cote et al. |
| 8,042,346 B2 | 10/2011 | Oh et al. |
(Continued)

FOREIGN PATENT DOCUMENTS

| CN | 103941975 A | 7/2014 |
| CN | 103984553 A | 8/2014 |
(Continued)

OTHER PUBLICATIONS

Brockhoeft at el., Interactive Augmented Reality for Dance, Proceedings of the Seventh International Conference on Computational Creativity, Jun. 2016, pp. 396-403 (Year: 2016).*
(Continued)

*Primary Examiner* — Charles Tseng
(74) *Attorney, Agent, or Firm* — Sughrue Mion, PLLC

(57) ABSTRACT

A system and method for providing a weather effect in an image includes selecting at least one weather texture image indicating weather, and providing a weather effect in the image by overlapping the selected weather texture image on the image.

17 Claims, 31 Drawing Sheets

Related U.S. Application Data continuation of application No. 16/788,893, filed on Feb. 12, 2020, now Pat. No. 11,302,040.

(51) Int. Cl.
| | |
|---|---|
| *G06T 11/00* | (2006.01) |
| *G06T 11/60* | (2006.01) |
| *G06V 10/26* | (2022.01) |
| *G06V 10/82* | (2022.01) |

(52) U.S. Cl.
CPC ............. *G06V 10/26* (2022.01); *G06V 10/82* (2022.01); *G06T 2207/20212* (2013.01); *G06T 2207/30192* (2013.01)

(56) References Cited

U.S. PATENT DOCUMENTS

| | | | |
|---|---|---|---|
| 9,524,701 | B2 | 12/2016 | Song et al. |
| 10,049,477 | B1 | 8/2018 | Kokemohr et al. |
| 10,926,176 | B1* | 2/2021 | Snyder ................. A63F 13/573 |
| 2007/0250591 | A1 | 10/2007 | Milic-Frayling et al. |
| 2008/0100625 | A1 | 5/2008 | Johnson et al. |
| 2009/0186604 | A1 | 7/2009 | Ruy et al. |
| 2010/0079426 | A1 | 4/2010 | Pance |
| 2014/0320507 | A1 | 10/2014 | Myung et al. |
| 2016/0048995 | A1 | 2/2016 | Sun |
| 2016/0309142 | A1 | 10/2016 | Kiyosawa |
| 2017/0061635 | A1 | 3/2017 | Oberheu et al. |
| 2017/0309051 | A1 | 10/2017 | Yamasaki et al. |
| 2018/0231871 | A1 | 8/2018 | Wang et al. |
| 2019/0114744 | A1* | 4/2019 | Albrecht ............... G06T 3/4053 |
| 2019/0213778 | A1 | 7/2019 | Du |
| 2019/0304159 | A1 | 10/2019 | Dai |

FOREIGN PATENT DOCUMENTS

| | | |
|---|---|---|
| CN | 107332978 A | 11/2017 |
| CN | 108848271 A | 11/2018 |
| CN | 109241465 A | 1/2019 |
| GB | 2488237 A | 8/2012 |
| KR | 10-2005-0038870 A | 4/2005 |
| KR | 10-0554796 B1 | 2/2006 |
| KR | 10-2007-0070646 A | 7/2007 |
| KR | 10-0764302 B1 | 10/2007 |
| KR | 10-2015-0095633 A | 8/2015 |

OTHER PUBLICATIONS

Communication issued Jan. 25, 2022 by the European Patent Office in European Patent Application No. 20758711.4.
International Search Report and Written Opinion (PCT/ISA/210 and PCT/ISA/237), issued May 14, 2020 by International Searching Authority in International Application No. PCT/KR2020/001627.
Marc Jaeger, "Enhancing virtual natural scenes using quick and dirty image based recipes", Plant Growth Modeling, Simulation, Visualization And Applications (PMA), 2012 IEEE Fourth International Symposium ON, IEEE, Oct. 31, 2012, Oct. 31-Nov. 3, 2012, pp. 164-171, doi: 10.1109/PMA.2012.6524829.
Office Action issued Jun. 24, 2024 by the Korean Patent Office for KR Patent Application No. 10-2019-0122660.
Office Action issued on May 10, 2024 by the Chinese Patent Office in corresponding CN Patent Application No. 202080015016.3.
European Extended Search Report issued Aug. 1, 2024 by the European Patent Office for EP Patent Application No. 24174529.8.
Communication dated Feb. 13, 2024 issued by the European Patent Office in European Patent Application No. 20758711.4.
Communication dated Dec. 31, 2024 issued by the China National Intellectual Property Administration in Chinese Patent Application No. 202080015016.3.

* cited by examiner

FIG. 19

| Metadata | Amount | DESCRIPTION | File type |
|---|---|---|---|
| Request parameter | Fixed | effect_id<br>image_num<br>effect-information<br>(type, prarmeters) | Json |
| Images | Fixed | SINGLE IMAGE | Json |
| Depth map | Fixed | Depth estimation result | File |
| Segmentation map | Fixed | Semantic segmentation result | File |
| texture | Fixed | WEATHER-DEPENDENT DATA | Files |

FIG. 26
IMAGE
NIGHT
EVENING
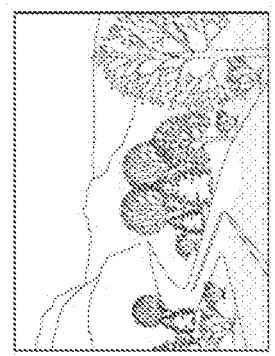
AFTERNOON
REFERENCE IMAGE
MORNING FIG. 29
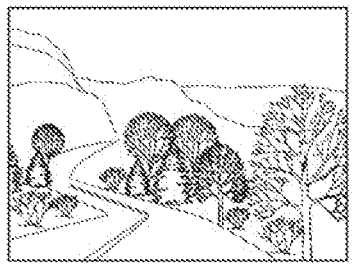
ORIGINAL IMAGE
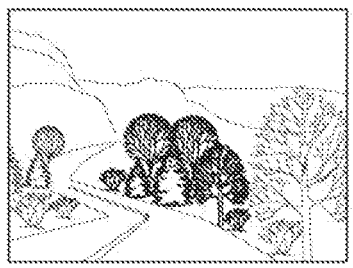 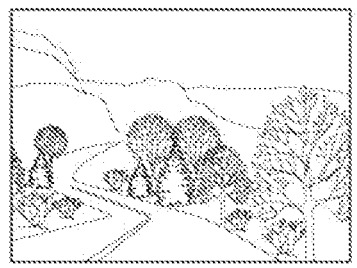 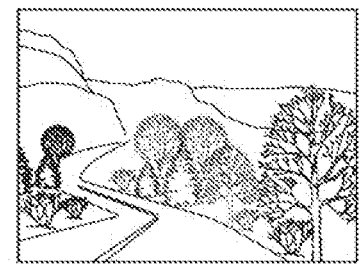
FIG. 30
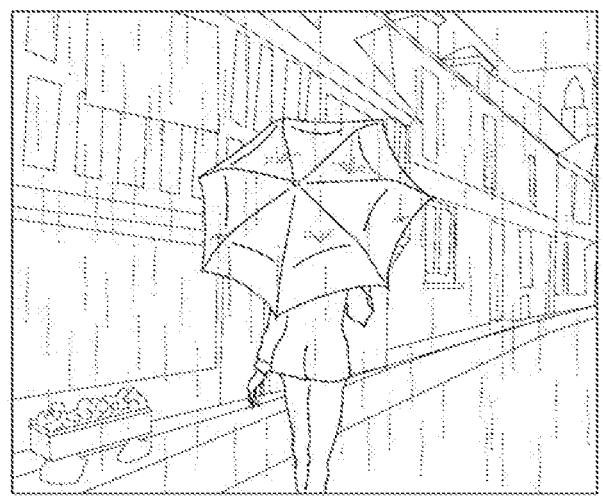

SYSTEM AND METHOD FOR PROVIDING WEATHER EFFECT IN IMAGE

CROSS-REFERENCE TO RELATED APPLICATIONS

This is a Continuation application of U.S. application Ser. No. 17/717,937 filed Apr. 11, 2022, which is a Continuation application of U.S. application Ser. No. 16/788,893 filed on Feb. 12, 2020, which is based on and claims priority under 35 U.S.C. § 119 to Korean Patent Application No. 10-2019-0018823, filed on Feb. 18, 2019, Korean Patent Application No. 10-2019-0075228, filed on Jun. 24, 2019, and Korean Patent Application No. 10-2019-0122660, filed on Oct. 2, 2019, in the Korean Intellectual Property Office, the disclosures of which are incorporated herein by reference in their entireties.

BACKGROUND

1. Field

The disclosure relates to a system and method for providing a weather effect in an image.

2. Description of Related Art

Currently, televisions or mobile devices display weather information by using text or pre-designed media. However, weather information may not be effectively provided to users by using text and icons. In order to provide weather information in the form of video data, time and resources are required to produce the video data.

SUMMARY

Aspects of the disclosure provide a system capable of allowing a device to simulate a weather effect in an image by using few computing resources.

Aspects of the disclosure also provide a system capable of providing a three-dimensional (3D) weather effect by predicting a 3D space in a two-dimensional (2D) picture by using an artificial intelligence model.

Aspects of the disclosure further provide a system capable of efficiently utilizing a storage space by simulating a weather effect in an image in real time by using a weather texture image.

Additional aspects will be set forth in the description which follows and will be apparent from the description, or may be learned by practice of the presented embodiments of the disclosure.

According to an embodiment of the disclosure, there is provided a method of a device providing a weather effect in an image including obtaining an image to which the weather effect is to be applied, obtaining at least one weather texture image illustrating the weather, and providing the weather effect in the image based on the weather texture image by sequentially overlapping a plurality of image segments obtained from the obtained weather texture image, on the image.

According to another embodiment of the disclosure, a device for providing a weather effect in an image includes a display, a memory storing one or more instructions, and a processor configured to execute the one or more instructions to obtain an image to which the weather effect is to be applied, select at least one weather texture image illustrating the weather effect, and provide the weather effect in the image based on the weather texture image on the display by sequentially overlapping a plurality of image segments obtained from the weather texture image, on the image.

According to another embodiment of the disclosure, a computer-readable recording medium has recorded thereon a computer program for executing the above-described method.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 19 is a table showing an example of information provided to a device to simulate a weather effect, according to an embodiment of the disclosure;

FIG. 26 is a schematic diagram illustrating an example of reference images corresponding to preset time periods, according to an embodiment of the disclosure;

FIG. 29 is a schematic diagram illustrating an example of changing a color style of an image, according to an embodiment of the disclosure;

FIG. 30 is a schematic diagram illustrating an example of an image in which a rain effect is reflected, according to an embodiment of the disclosure;

DETAILED DESCRIPTION

Figure 1:
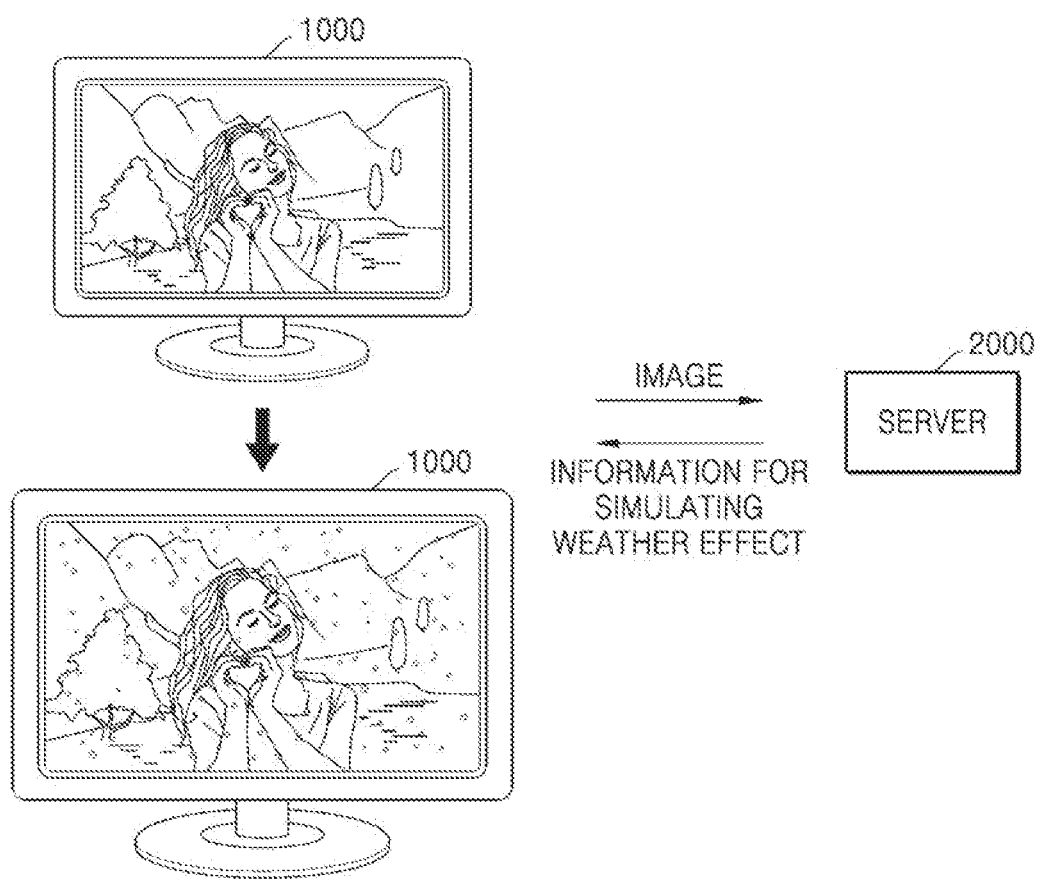
FIG. 1 is a schematic diagram illustrating an example of a system for providing a weather effect in a certain image, according to an embodiment of the disclosure.

Hereinafter, the disclosure will be described in detail by explaining embodiments with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like reference numerals denote like elements.

It will be understood that when an element is referred to as being "connected to" another element, it may be "directly connected to" the other element or be "electrically connected to" the other element through an intervening element. It will be further understood that the terms "includes" and/or "including", when used herein, specify the presence of stated elements, but do not preclude the presence or addition of one or more other elements, unless the context clearly indicates otherwise.

Throughout the disclosure, the expression "at least one of a, b or c" indicates only a, only b, only c, both a and b, both a and c, both b and c, all of a, b, and c, or variations thereof.

Reference will now be made in detail to embodiments of the disclosure, examples of which are illustrated in the accompanying drawings.

FIG. 1 is a schematic diagram illustrating an example of a system for providing a weather effect in a certain image, according to an embodiment of the disclosure.

Referring to FIG. 1, the system for providing the weather effect may include a device 1000 and a server 2000.

The device 1000 may select a specific image and display the image as including a three-dimensional (3D) weather effect. The device 1000 may select the image and receive, from the server 2000, information for simulating the weather effect in the selected image. The device 1000 may provide the weather effect in the selected image by simulating a weather texture image as being overlaid or otherwise encompassed in the selected image. The weather texture image may be an image of objects indicating specific weather and may include, for example, an image of raindrops, an image of snowflakes, or an image of fog, but the type of the weather effect is not limited thereto.

The device 1000 may provide the weather effect in the image by cutting out a plurality of image segments from the weather texture image and sequentially overlaying the plurality of image segments on the image. The device 1000 may analyze depths of objects in the image and overlap the image segments reflecting current weather, on the image based on the analyzed depths. To provide the weather effect in an original picture or a picture converted from the original picture, the device 1000 may adjust transparencies of the image segments based on depths and composite the transparency-adjusted image segments with the image.

The device 1000 may reflect the weather effect in the certain image in an ambient mode. The ambient mode may be an operating mode for providing only some functions of the device 1000 at low power. For example, in the ambient mode, most functions of the device 1000 may not be activated and only an input/output function and a few preset functions of the device 1000 may be activated on a display. Alternatively, the device 1000 may display the image in which the weather effect is reflected, as a background image of the device 1000.

The device 1000 may be, for example, a smartphone, a tablet PC, a PC, a smart TV, a mobile phone, a personal digital assistant (PDA), a laptop, a media player, a microserver, a global positioning system (GPS) device, an e-book reader, a digital broadcast receiver, a navigation system, a kiosk, an MP3 player, a digital camera, a home appliance, or another mobile or non-mobile computing device, but is not limited thereto.

Figure 2:
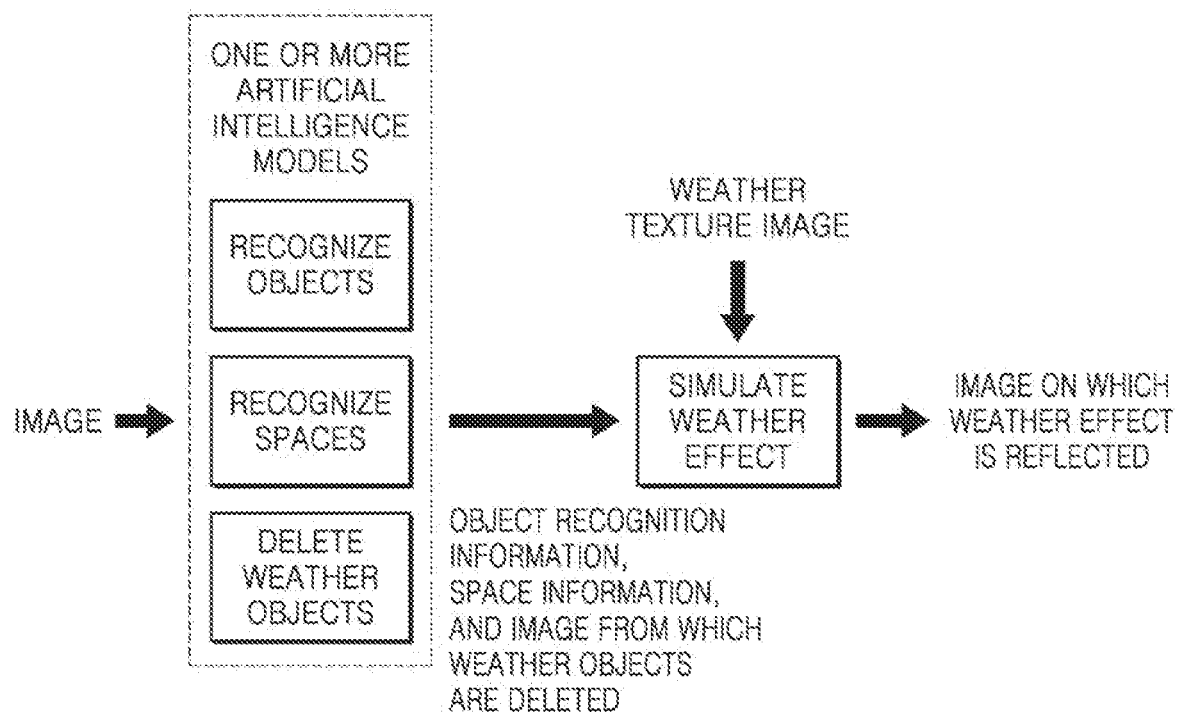
FIG. 2 is a schematic diagram illustrating an example of reflecting a weather effect in an image, according to an embodiment of the disclosure.

FIG. 2 is a schematic diagram illustrating an example of reflecting a weather effect in an image, according to an embodiment of the disclosure.

Referring to FIG. 2, the image may be analyzed using one or more artificial intelligence models. The image may be, for example, a two-dimensional (2D) or a three-dimensional (3D) picture. The image may be input to a first artificial intelligence model for detecting and recognizing objects in the image, and thus object recognition information indicating the recognized objects in the image may be output from the first artificial intelligence model. The object recognition information may include information about locations and shapes of the objects in the image. The image may be input to a second artificial intelligence model for analyzing spaces in the image, and thus space information about depths of the spaces in the image may be output from the second artificial intelligence model. The second artificial intelligence model may be used to estimate a 3D space in a 2D image by analyzing depths of spaces in the 2D image. The image may be input to a third artificial intelligence model for deleting weather objects in the image, and thus the image from which the weather objects are deleted may be output from the third artificial intelligence model.

The first to third artificial intelligence models may be constructed considering an application field of the recognition models, the purpose of training, or computing performance of a device. The first to third artificial intelligence models may be, for example, models based on an artificial neural network. The artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but the type of artificial neural network is not limited thereto.

A single artificial intelligence model for providing functions of two or more of the above-described first to third artificial intelligence models may be used.

The device 1000 may obtain the object recognition information, the space information, and the image from which the weather objects are removed, and obtain a weather texture image corresponding to current weather. The device 1000 may cut out a plurality of image segments from the weather texture image based on preset criteria. The device 1000 may provide an image in which the weather effect related to the current weather is reflected, by sequentially overlapping the plurality of image segments on the image from which the weather objects are deleted.

Figure 3:
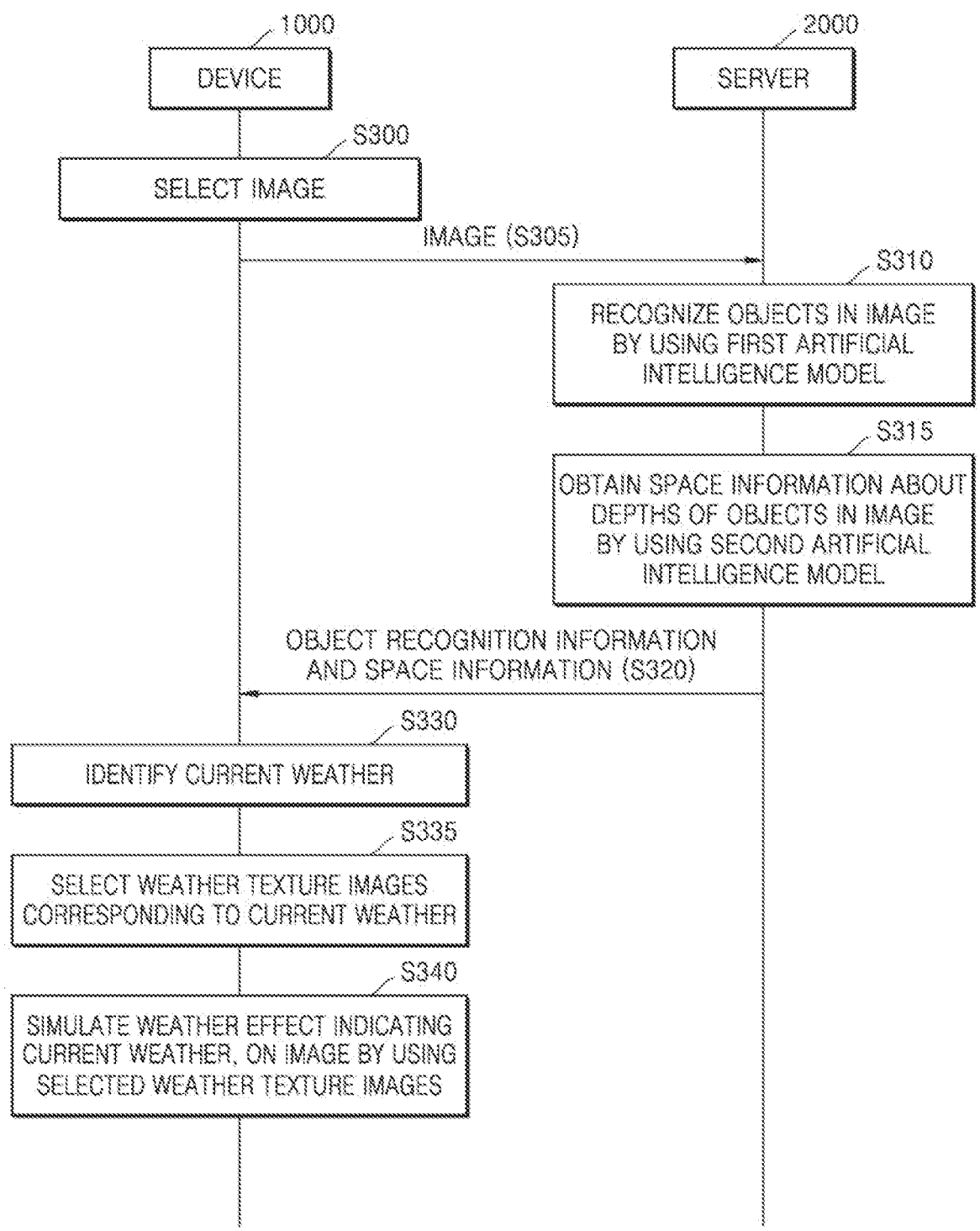
FIG. 3 is a flowchart of a method, performed by a system, of providing a weather effect in an image, according to an embodiment of the disclosure.

FIG. 3 is a flowchart of a method, performed by the system, of providing a weather effect in an image, according to an embodiment of the disclosure.

In operation S300, the device 1000 may select an image. The device 1000 may display a graphical user interface (GUI) for selecting an image to be displayed on a screen in an ambient mode, and select an image based on a user input received through the displayed GUI. For example, the device 1000 may select a picture stored in the device 1000, or a picture taken in real time.

In operation S305, the device 1000 may transmit the image to the server 2000. The device 1000 may provide the image to the server 2000 and request the server 2000 to provide data required to simulate a weather effect in the image.

Although the device 1000 selects and transmits the image to the server 2000 in operations S300 and S305, the disclosure is not limited thereto. The server 2000 may provide, to the device 1000, a list of images stored in the server 2000, and the device 1000 may select a specific image in the list of images.

In operation S310, the server 2000 may detect and recognize objects in the image by using a first artificial intelligence model. The server 2000 may obtain object recognition information indicating or identifying the objects in the image, by inputting the image to the first artificial intelligence model for recognizing the objects in the image. The objects may include, for example, people, the sky, buildings, and trees. The object recognition information is information indicating the objects recognized in the image and may include, for example, information about shapes of the objects included in the image, information about locations of the objects, and identification information of the objects, but the object recognition information is not limited thereto. The first artificial intelligence model may be a model pre-trained to recognize the objects in the image and may be, for example, a model based on an artificial neural network.

In operation S315, the server 2000 may obtain space information about depths of the objects in the image by using a second artificial intelligence model. The server 2000 may obtain space information about depths of spaces in the image, by inputting the image to a second artificial intelligence model for analyzing the spaces in the image. The space information is information indicating the depths of the spaces in the image and may include, for example, information about a depth of an object included in the image, information about a depth of a background in the image, and information about a depth relationship between objects in the image, but the space information is not limited thereto. For example, when the object in the image is a tree and the background of the image is the sky, the space information may include information indicating a depth of the tree, information indicating a depth of the sky, and information indicating that the tree is placed at a nearer reference location compared to the sky. The depths of the objects in the image may indicate whether each object is placed at a near location or a far location in the image. For example, when the depths of the objects in the image range from 0 to 100, a value from 0 to 40 may be set as a short distance, a value from 40 to 70 may be set as a middle distance, and a value from 70 to 100 may be set as a long distance. The second artificial intelligence model may be a model pre-trained to analyze the spaces in the image and may be, for example, a model based on an artificial neural network.

The first and second artificial intelligence models may be implemented by a single artificial intelligence model. In this case, the image may be input to the single artificial intelligence model for providing the function of the first artificial intelligence model and the function of the second artificial intelligence model, and thus the space information about the spaces in the image and the object recognition information about the objects in the image may be output.

In operation S320, the server 2000 may transmit the object recognition information and the space information to the device 1000. The server 2000 may transmit, to the device 1000, the object recognition information and the space information obtained by analyzing the image selected by the device 1000, by using at least one artificial intelligence model.

In operation S330, the device 1000 may identify a current weather condition corresponding to a current location of the device 1000. The device 1000 may identify the current weather of a region where the device 1000 is positioned, or a region selected by a user that is different from the region where the device 1000 is located. The device 1000 may receive weather information indicating the current weather, from the server 2000 in a preset cycle or in real time as requested by the device 1000. The weather information indicating the current weather may include, for example, information indicating clouds, snow, rain, fog, lightning, wind, precipitation, rainfall, fog density, cloud cover, wind direction, gusts, wind speed, relative humidity, temperature, sensible temperature, atmospheric pressure, solar radiation, visibility, ultraviolet (UV) index, and dew point, but the weather information is not limited thereto. The weather information may include, for example, information about a weather forecast, an hourly weather forecast, and a weekly weather forecast.

In operation S335, the device 1000 may obtain weather texture images corresponding to the current weather. The device 1000 may pre-store a plurality of weather texture images related to various types of weather, and select at least one weather texture image appropriate for the current weather from among the plurality of pre-stored weather texture images. For example, the device 1000 may store, in a memory, a plurality of weather texture images indicating rainy weather, a plurality of weather texture images indicating snowy weather, and a plurality of weather texture images indicating foggy weather.

The device 1000 may pre-store weather texture images related to forecasted weather, considering the information about the weather forecast, the hourly weather forecast, and the weekly weather forecast. For example, the device 1000 may request the server 2000 to provide weather texture images related to weather forecasted for a week, based on the weekly weather forecast and store the weather texture images received from the server 2000, in the memory. In this case, because the device 1000 stores, in the memory, only weather texture images related to weather forecasted for a preset time, the memory of the device 1000 may be efficiently managed.

A plurality of weather texture images pre-registered per type of the weather may respectively correspond to depth ranges. The plurality of weather texture images pre-registered per weather may differ from each other based on the depth ranges. The depth ranges may be values for defining ranges of depths of spaces in the image. For example, when the depths of the spaces in the image range from 0 to 100, a value from 0 to 40 may be set as a first depth range, a value from 40 to 70 may be set as a second depth range, and a value from 70 to 100 may be set as a third depth range. Details of weather expression may be increased in proportion to the number of depth ranges. Resources for proving a weather effect may be reduced in inverse proportion to the number of depth ranges. The number of depth ranges may be, for example, 2 to 10.

The device 1000 may select weather texture images corresponding to properties of the current weather, from among the plurality of weather texture images. The device 1000 may select the weather texture images based on the properties of the current weather and the depths of the spaces in the image. For example, the device 1000 may select weather texture images corresponding to a rainfall of 10 ml/h and a wind speed 7 km/h, from among the plurality of weather texture images, and select weather texture images corresponding to the first and second depth ranges of the spaces in the image, from among the selected weather texture images.

When weather texture images appropriate for the current weather are not stored in the memory, the device 1000 may request the server 2000 to provide the weather texture images appropriate for the current weather, and receive the requested weather texture images from the server 2000.

In operation S340, the device 1000 may simulate a weather effect indicating the current weather, in the image, by using the obtained weather texture images. The device 1000 may select for replacement or modification image segments from the selected weather texture images. The size of the weather texture images may be greater than that of the image selected by the device 1000, and the device 1000 may select the image segments from the weather texture images to fit the size of the image selected by the device 1000. The device 1000 may replace the image segments from the weather texture images by shifting a cutting location. Cutting locations may be differently determined based on properties of weather. For example, the device 1000 may determine the cutting locations as areas of a rain texture image including a large number of raindrops, when the rainfall is high, and determine the cutting locations as areas of the rain texture image including a small number of raindrops, when the rainfall is low. A degree of shifting may be differently determined based on a depth to which the weather texture image is to be applied. For example, because raindrops in a near space move fast, the device 1000 may cut out the image segments from the rain texture image by shifting a cutting location at large intervals to display the raindrops in the near space in the image. For example, because raindrops in a far space move slowly, the device 1000 may cut out the image segments from the rain texture image by shifting a cutting location at small intervals to display the raindrops in the far space in the image.

The device 1000 may provide the weather effect in the image by sequentially overlapping, interleaving, or otherwise incorporating the image segments on the image in a preset cycle. For example, the device 1000 may overlap an image segment obtained from a weather texture image corresponding to the first depth range and an image segment obtained from a weather texture image corresponding to the second depth range, together on the image. A cycle for sequentially reproducing the image segments obtained from the weather texture image corresponding to the first depth range may differ from a cycle for sequentially reproducing the image segments obtained from the weather texture image corresponding to the second depth range.

The device 1000 may simulate the weather effect such as a snow, rain, or fog effect in the image by using a frame of the weather texture image, by incorporating the image segments cut out from the weather texture image, on the image.

The device 1000 may differently adjust transparencies of the image segments based on depths, and simulate the weather effect by using the transparency-adjusted image segments. For example, when depths of spaces in the image range from 0 to 100, the device 1000 may adjust a transparency of an image segment corresponding to a depth from 0 to 40, to 30%, adjust a transparency of an image segment corresponding to a depth from 40 to 70, to 50%, and adjust a transparency of an image segment corresponding to a depth from 70 to 100, to 70%.

Figure 4:
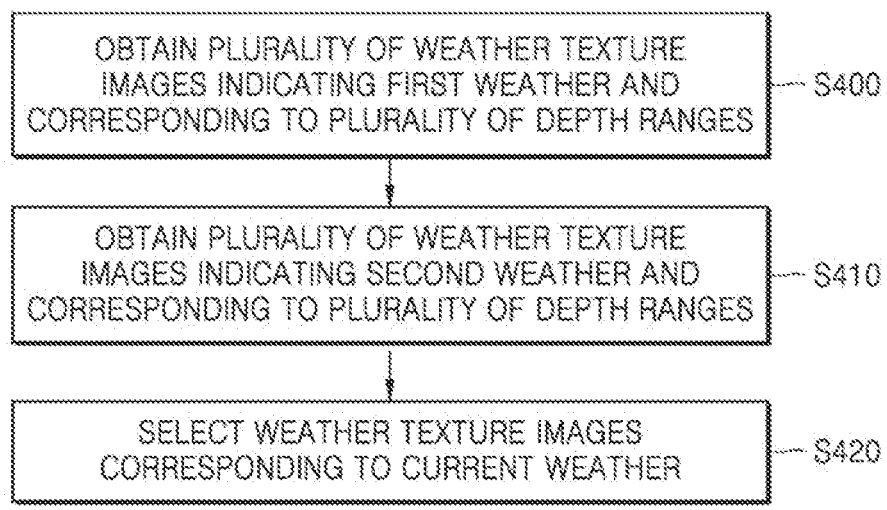
FIG. 4 is a flowchart of a method, performed by a device, of selecting weather texture images corresponding to current weather, according to an embodiment of the disclosure.

FIG. 4 is a flowchart of a method, performed by the device 1000, of selecting weather texture images corresponding to current weather, according to an embodiment of the disclosure.

In operation S400, the device 1000 may obtain a plurality of weather texture images indicating a first weather condition and corresponding to a plurality of depth ranges. The plurality of weather texture images indicating the first weather condition may respectively correspond to the plurality of depth ranges. The device 1000 may obtain, for example, a weather texture image corresponding to the first weather condition and a first depth range, a weather texture image corresponding to the first weather condition and a second depth range, and a weather texture image corresponding to the first weather condition and a third depth range, from a memory. The first weather condition may correspond to at least one weather property and an intensity or value thereof. The weather property may include, for example, information indicating clouds, snow, rain, fog, lightning, wind, precipitation, rainfall, fog density, cloud cover, wind direction, gusts, wind speed, relative humidity, temperature, sensible temperature, atmospheric pressure, solar radiation, visibility, UV index, and dew point, but the weather property is not limited thereto.

In operation S410, the device 1000 may obtain a plurality of weather texture images indicating a second weather condition and corresponding to the plurality of depth ranges. The plurality of weather texture images indicating the second weather condition may respectively correspond to the plurality of depth ranges. The device 1000 may obtain, for example, a weather texture image corresponding to the second weather condition and the first depth range, a weather texture image corresponding to the second weather condition and the second depth range, and a weather texture image corresponding to the second weather condition and the third depth range, from the memory. The second weather condition may correspond to at least one weather property and an intensity or value thereof. The weather property may include, for example, information indicating clouds, snow, rain, fog, lightning, wind, precipitation, rainfall, fog density, cloud cover, wind direction, gusts, wind speed, relative humidity, temperature, sensible temperature, atmospheric pressure, solar radiation, visibility, UV index, and dew point, but the weather property is not limited thereto.

In operation S420, the device 1000 may select weather texture images corresponding to current weather. The current weather may be the weather in a location corresponding to the location of the device 1000, or a location selected by a user of the device 1000 that is different from the current location of the device 1000. The device 1000 may select the weather texture images corresponding to the properties of the current weather, from among the plurality of weather texture images. The device 1000 may select the weather texture images based on the properties of the current weather and depths of spaces in an image. For example, the device 1000 may select weather texture images corresponding to a rainfall of 10 ml/h and a wind speed 7 km/h, from among the plurality of weather texture images, and select weather texture images corresponding to the first and second depth ranges of the spaces in the image, from among the selected weather texture images.

When weather texture images appropriate for the current weather are not stored in the memory, the device 1000 may request the server 2000 to provide the weather texture images appropriate for the current weather, and receive the requested weather texture images from the server 2000.

Although the device 1000 obtains the plurality of weather texture images indicating the first weather condition and the plurality of weather texture images indicating the second weather condition in FIG. 4, the device 1000 obtaining the weather texture images is not limited thereto. The device 1000 may obtain weather texture images indicating various preset types of weather. The device 1000 may previously receive, from the server 2000, the weather texture images indicating various preset types of weather, and thus effectively use weather texture images appropriate for the current weather even when the current weather is changed.

Figure 5:
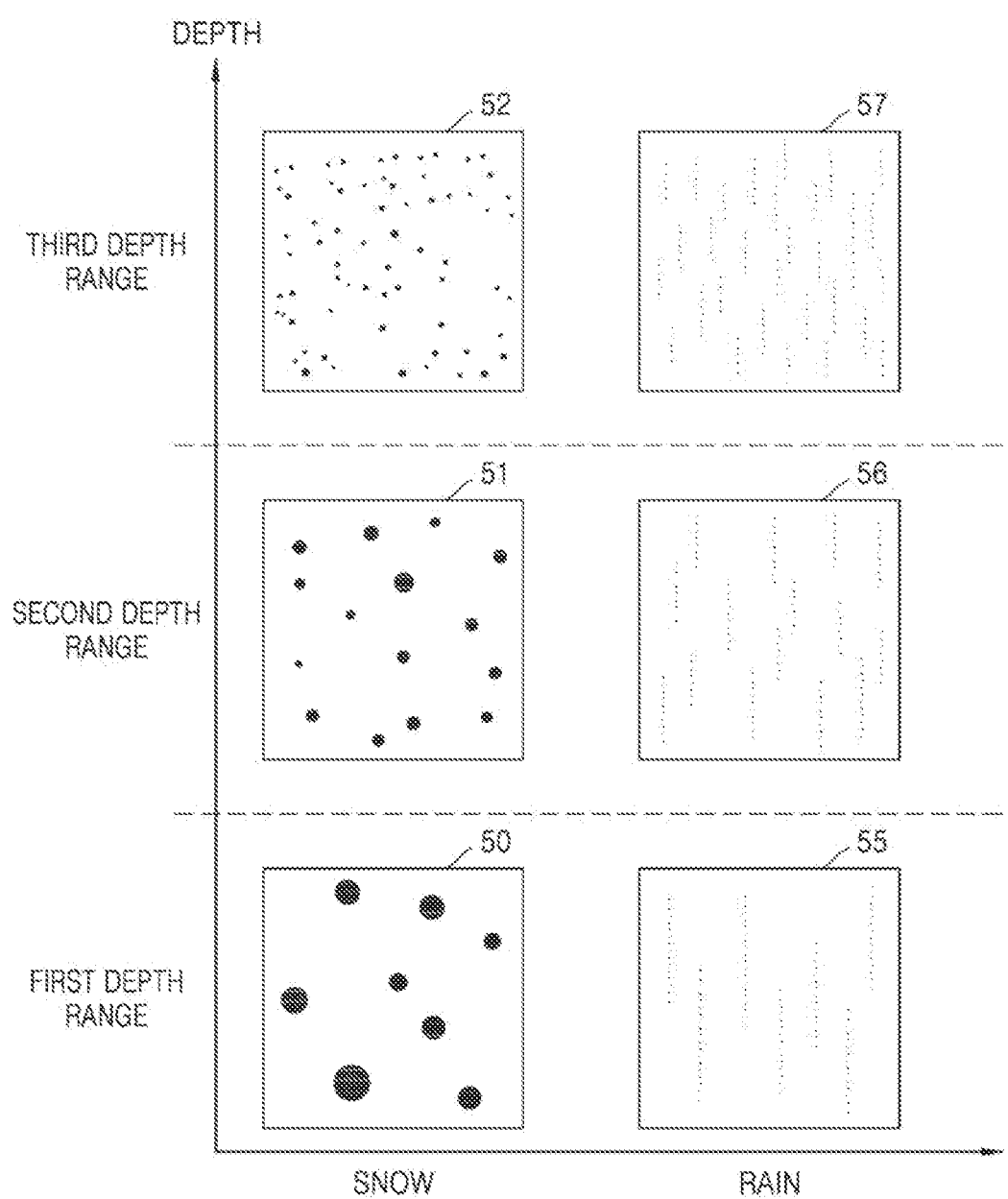
FIG. 5 is a schematic diagram illustrating an example of a plurality of weather texture images corresponding to weather, according to an embodiment of the disclosure.

FIG. 5 is a schematic diagram illustrating an example of a plurality of weather texture images corresponding to weather, according to an embodiment of the disclosure.

Referring to FIG. 5, a plurality of weather texture images indicating snowy weather may include a first snow texture image 50, a second snow texture image 51, and a third snow texture image 52. The first snow texture image 50 may correspond to 'snow' and a first depth range, the second snow texture image 51 may correspond to 'snow' and a second depth range, and the third snow texture image 52 may correspond to 'snow' and a third depth range.

The first depth range may be shallower than the second depth range, and the second depth range may be shallower than the third depth range. For example, when depths of spaces or objects in an image range from 0 to 100, a value from 0 to 40 may be set as the first depth range, a value from 40 to 70 may be set as the second depth range, and a value from 70 to 100 may be set as the third depth range. The first snow texture image 50 corresponds to a depth shallower than those of the second and third snow texture images 51 and 52, and thus snowflakes included in the first snow texture image 50 may be larger in size than those included in the second and third snow texture images 51 and 52.

The second snow texture image 51 corresponds to a depth deeper than that of the first snow texture image 50 and shallower than that of the third snow texture image 52, and thus snowflakes included in the second snow texture image 51 may appear smaller in size than those included in the first snow texture image 50 and larger in size than those included in the third snow texture image 52.

Alternatively, for example, a plurality of weather texture images indicating rainy weather may include a first rain texture image 55, a second rain texture image 56, and a third rain texture image 57. The first rain texture image 55 may correspond to 'rain' and the first depth range, the second rain texture image 56 may correspond to 'rain' and the second depth range, and the third rain texture image 57 may correspond to 'rain' and the third depth range.

The device 1000 may store, in a memory, the first to third snow texture images 50 to 52, the first to third rain texture images 55 to 57, etc. related to various weather properties and various depth ranges.

Although a weather texture image corresponds to one weather property in FIG. 5, the weather texture image is not limited thereto. The weather texture image may correspond to a plurality of weather properties. For example, the weather texture image may correspond to rain, rainfall, wind speed, and wind direction. In this case, the size, a density, a direction, etc. of objects (e.g., raindrops) included in the weather texture image may differ based on the weather properties corresponding to the weather texture image.

The weather texture image may be an image in which weather objects are displayed on a transparent layer. As such, when the weather texture image is overlaid on the image, only the weather objects may be displayed on the image.

Figure 6:
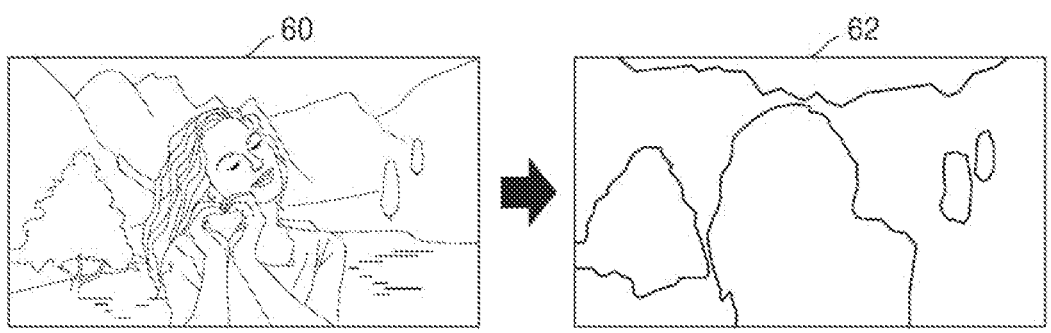
FIG. 6 is a schematic diagram illustrating an example of object recognition information indicating objects recognized in an image, according to an embodiment of the disclosure.

FIG. 6 is a schematic diagram illustrating an example of object recognition information 62 indicating objects recognized in an image 60, according to an embodiment of the disclosure.

Referring to FIG. 6, the server 2000 may recognize objects in the image 60 and obtain the object recognition information 62 about shapes and locations of the objects, by inputting the image 60 to a first artificial intelligence model. Although the object recognition information 62 has a form of an image in FIG. 6, the object recognition information 62 is not limited thereto and may include various-format data capable of identifying the locations, the shapes, etc. of the objects.

The object recognition information 62 is information indicating the objects recognized in the image 60 and may include, for example, information about shapes of the objects included in the image 60, information about locations of the objects, and identification information of the objects, but the object recognition information is not limited thereto. The first artificial intelligence model may be a model pre-trained to detect and recognize the objects in the image 60 and may be, for example, a model based on an artificial neural network. The first artificial intelligence model may be, for example, an artificial intelligence model for semantic image segmentation. The first artificial intelligence model may detect and recognize the objects in the image 60 and the locations of the objects by estimating classes of pixels in the image 60.

Figure 7:
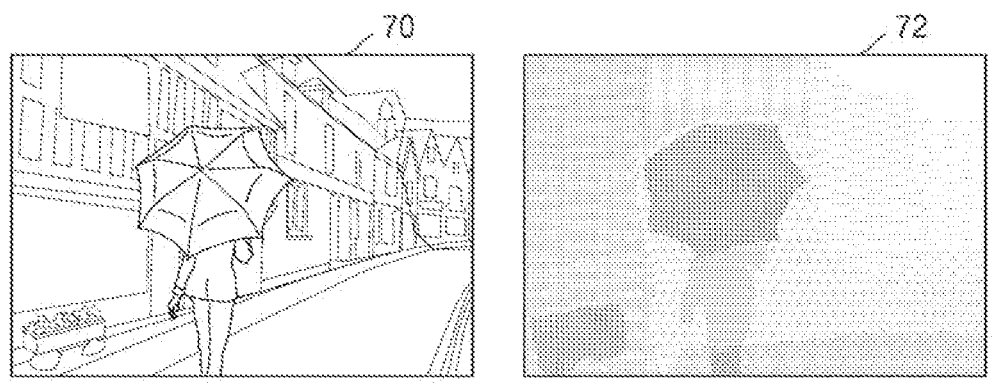
FIG. 7 is a schematic diagram illustrating an example of space information indicating spaces analyzed in an image, according to an embodiment of the disclosure.

FIG. 7 is a schematic diagram illustrating an example of space information 72 indicating spaces analyzed in an image 70, according to an embodiment of the disclosure.

Referring to FIG. 7, the server 2000 may analyze spaces or regions in the image 70 and obtain the space information 72 indicating depths of the spaces in the image 70, by inputting the image 70 to a second artificial intelligence model. Although the space information 72 has a form of an image in FIG. 7, the space information 72 is not limited thereto and may include various-format data capable of identifying the depths of the spaces in the image 70. The space information 72 is information indicating the depths of the spaces in the image 70 and may include, for example, information about a depth of an object included in the image 70, information about a depth of a background in the image 70, and information about a depth relationship between objects in the image 70, but is not limited thereto. The second artificial intelligence model may be a model pre-trained to analyze the depths of the spaces in the image 70 and may be, for example, a model based on an artificial neural network. The second artificial intelligence model may be, for example, an artificial intelligence model for depth prediction/estimation.

Figure 8:
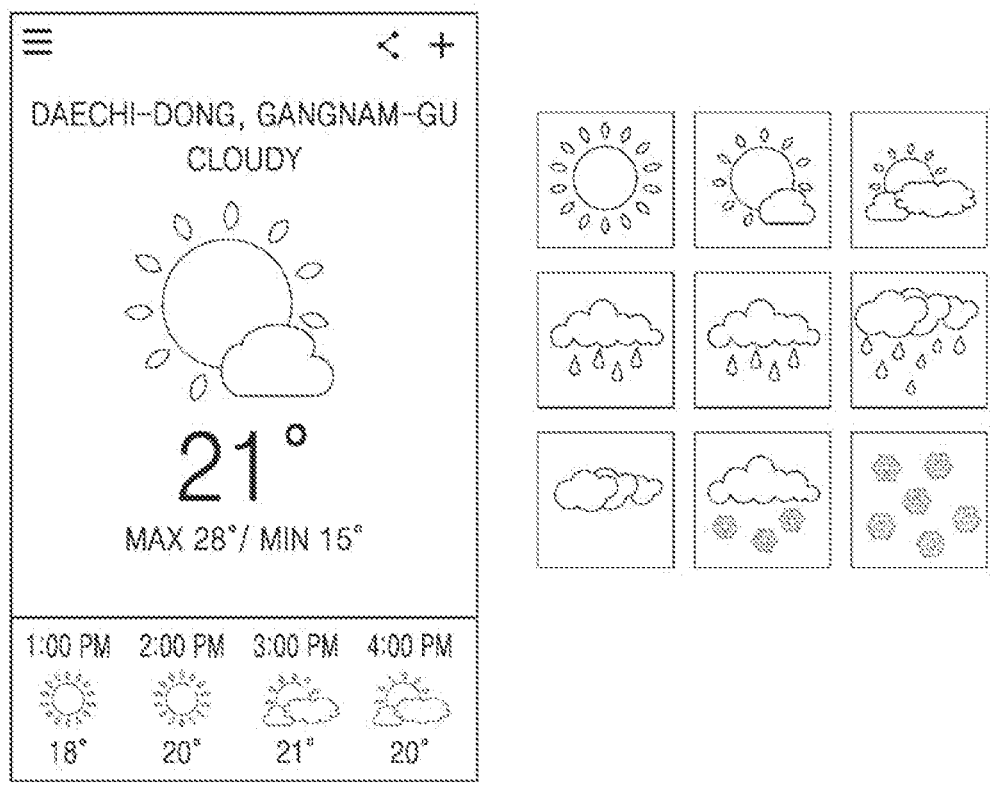
FIG. 8 is a schematic diagram illustrating an example of weather information according to an embodiment of the disclosure.

FIG. 8 is a schematic diagram illustrating an example of weather information according to an embodiment of the disclosure.

Referring to FIG. 8, the weather information may include, for example, information indicating location, time, clouds, snow, rain, relative humidity, temperature, sensible temperature, weather, atmospheric pressure, solar radiation, visibility, wind direction, gusts, wind speed, UV index, and dew point.

The device 1000 may simulate a 3D image effect in an image by using a weather texture image indicating weather, e.g., snow, rain, sunshine, clouds, fog, lightning, or wind. The device 1000 may reflect a 3D image effect related to one or more of visibility, wind speed, and temperature, in an original image. The device 1000 may reflect a 3D image effect considering, for example, weather parameters such as the strength of wind, the amount of rain, the amount of snow, the density of fog, the resistance of the air, a distance, and a direction, in the image. Thus, the intensity of the weather effect may be correspondingly reflected in the image according to the intensity of the weather effect in the particular location selected by the user or the location of the device 1000.

Figure 9:
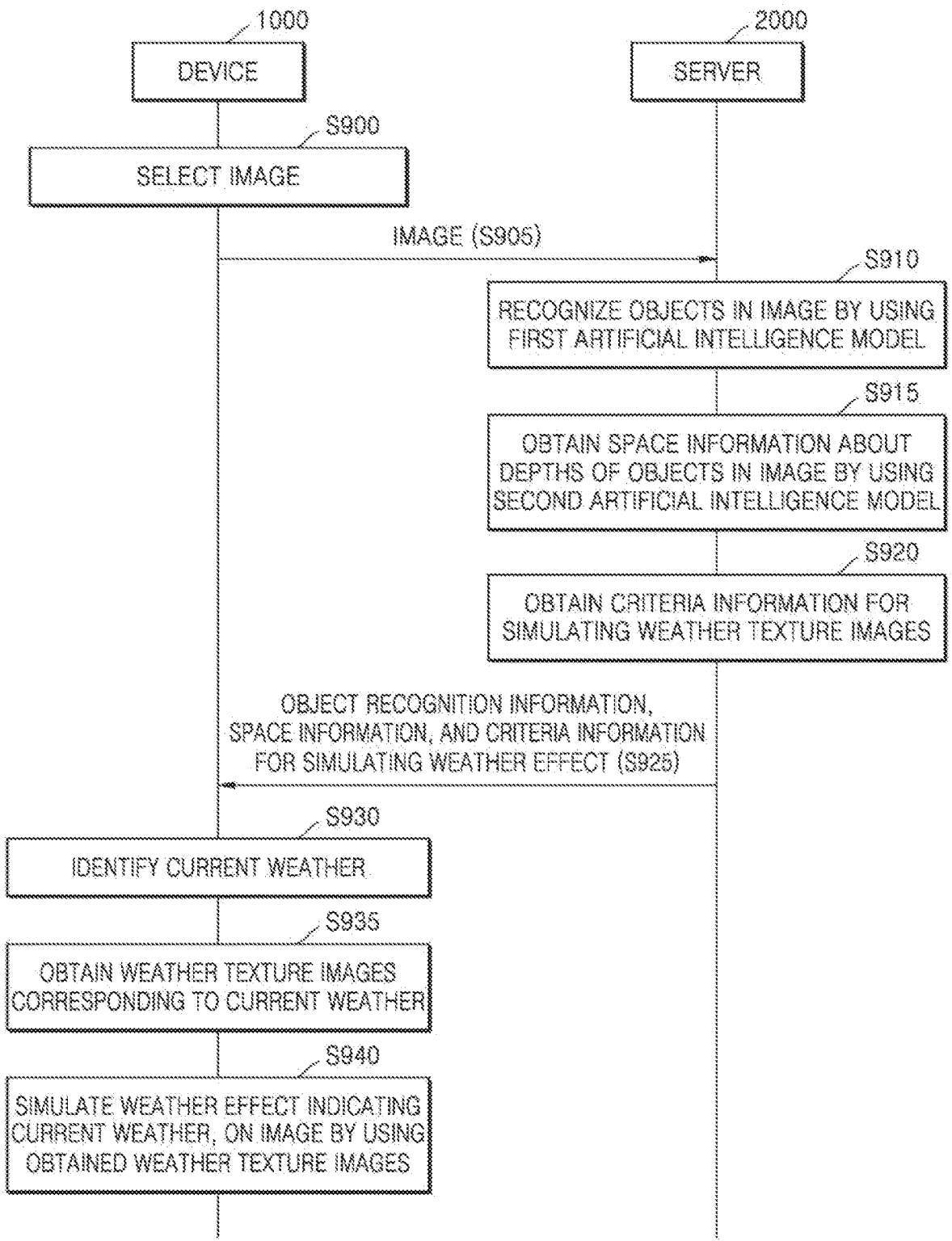
FIG. 9 is a flowchart of a method, performed by a system, of providing a weather effect in an image based on criteria information for simulating the weather effect, according to an embodiment of the disclosure.

FIG. 9 is a flowchart of a method, performed by the system, of providing a weather effect in an image based on criteria information for simulating the weather effect, according to an embodiment of the disclosure.

Operations S900 to S915 correspond to operations S300 to S315 of FIG. 3, and thus a redundant description thereof is omitted.

In operation S920, the server 2000 may obtain criteria information for simulating a weather effect. The server 2000 may determine criteria for simulating weather texture images. The server 2000 may determine, for example, criteria for a weather texture image to be used based on weather, criteria for a part of the weather texture image from which image segments are to be replaced or modified, criteria for intervals between the image segments, and criteria for a time during which the image segments are displayed based on a depth range. The server 2000 may obtain criteria information about the determined criteria. The criteria information for simulating the weather texture image may include, for example, information about an identifier of a weather texture image to be used based on weather, criteria for replacing or modifying image segments based on the weather texture image, intervals between the image segments, and a time for displaying the image segments. The criteria information may be parameter-type data for downloading data about specific criteria for simulating the weather texture images. The criteria for simulating the weather texture images, and the criteria information will be described in detail below.

In operation S925, the server 2000 may provide the criteria information about the determined criteria, object recognition information, and space information to the device 1000. The criteria information, the object recognition information, and the space information may be provided to the device 1000 in the form of parameter values.

The device 1000 may identify a current weather based on the location of the device 1000 or a location selected by a user in operation S930, and obtain a weather texture image corresponding to the current weather, in operation S935. The device 1000 may obtain the weather texture image corresponding to the current weather, based on the criteria information received from the server 2000. For example, the device 1000 may check an identifier of the weather texture image corresponding to the current weather, from the criteria information, and receive the weather texture image from the server 2000 based on the identifier of the weather texture image. Alternatively, the device 1000 may extract the weather texture image from a memory based on the identifier of the weather texture image. The device 1000 may select the weather texture image based on the current weather and a depth of an object and a space in an image.

In operation S940, the device 1000 may simulate a weather effect in the image, based on the criteria information. The device 1000 may select a plurality of image segments from the weather texture image according to the current weather and the depth of the object and the space in the image, based on the criteria information and sequentially overlap the plurality of image segments on the image in a certain cycle. For example, the device 1000 may overlap the plurality of image segments on the image by using alpha blending. In this case, the device 1000 may apply certain transparencies to the image segments based on depth ranges corresponding to the image segments, and overlap the image segments to which the certain transparencies are applied, on the image. The device 1000 may mask a part of an image segment corresponding to a long-distance area, based on certain criteria.

Figure 10:
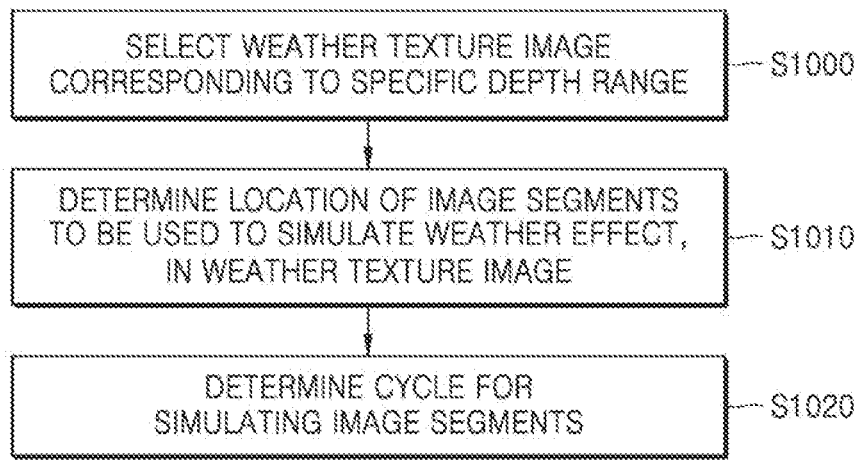
FIG. 10 is a flowchart of a method, performed by a server of a system, of determining criteria for simulating a plurality of weather texture images, according to an embodiment of the disclosure.

FIG. 10 is a flowchart of a method, performed by the server 2000 of the system, of determining criteria for simulating a plurality of weather texture images, according to an embodiment of the disclosure.

In operation S1000, the server 2000 may select a weather texture image corresponding to a specific depth range. The server 2000 may select a weather texture image corresponding to specific weather and a specific depth range, from among weather texture images stored in a database (DB).

In operation S1010, the server 2000 may determine locations of image segments to be used to simulate a weather effect, in the weather texture image. The server 2000 may determine criteria for a part of the weather texture image from which the image segments are obtained, and intervals between the image segments, based on weather properties. For example, when the rainfall is high, the server 2000 may set locations of the image segments in such a manner that the image segments are cut out at large intervals from parts of a rain texture image having dense raindrops.

In operation S1020, the server 2000 may determine a cycle for simulating the image segments. The server 2000 may determine the cycle for simulating the image segments, based on a depth range. For example, the server 2000 may set a short simulation cycle for image segments cut out from a weather texture image corresponding to a shallow depth range, and set a long simulation cycle for image segments cut out from a weather texture image corresponding to a deep depth range. Accordingly, weather effects to be displayed at different depths of the image may be independently reproduced.

Figure 11:
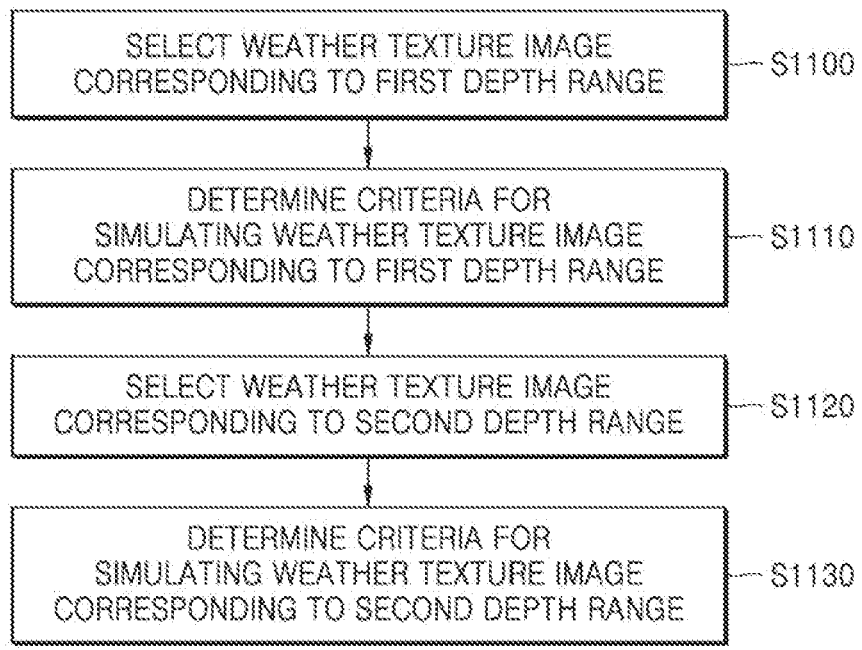
FIG. 11 is a flowchart of a method, performed by a server, of determining criteria for simulating a weather texture image per depth range, according to an embodiment of the disclosure.

FIG. 11 is a flowchart of a method, performed by the server 2000, of determining criteria for simulating a weather texture image per depth range, according to an embodiment of the disclosure.

In operation S1100, the server 2000 may select a weather texture image corresponding to a first depth range. The first depth range may be a range of a depth shallower than that of a specific object in an image, and the weather texture image corresponding to the first depth range may include weather objects having a size greater than a preset value. The weather objects may be objects indicating specific weather, e.g., raindrops or snowflakes. For example, when depths of spaces in the image range from 0 to 100 and the nearest object in the image has a depth of 40, the server 2000 may determine a depth range of 0 to 40 as the first depth range.

In operation S1110, the server 2000 may determine criteria for simulating the weather texture image corresponding to the first depth range. The server 2000 may determine criteria for locations of, intervals between, and a simulation cycle of image segments to be obtained from the weather texture image, based on properties of weather and a depth range of the weather texture image. For example, when the weather texture image corresponding to the first depth range is a rain texture image corresponding to rainy weather, the server 2000 may set criteria for a part of the rain texture image from which the image segments are to be obtained, based on at least one of precipitation, wind speed, or wind direction. The server 2000 may set intervals between the image segments to be obtained, based on at least one of precipitation, wind speed, or wind direction. The server 2000 may set a simulation cycle for sequentially simulating the image segments, based on the depth range of the weather texture image. For example, the first depth range may be a depth range shallower than a second depth range to be described below, and the image segments obtained from the weather texture image corresponding to the first depth range may be simulated in the image in a cycle shorter than that of image segments cut out from a weather texture image corresponding to the second depth range to be described below.

In operation S1120, the server 2000 may select a weather texture image corresponding to the second depth range. The second depth range may be a range of a depth deeper than that of the specific object in the image, and the weather texture image corresponding to the second depth range may include weather objects having a size less than the preset value. For example, when depths of spaces in the image range from 0 to 100 and the nearest object in the image has a depth of 40, the server 2000 may determine a depth range of 40 to 100 as the second depth range.

In operation S1130, the server 2000 may determine criteria for simulating the weather texture image corresponding to the second depth range. The second depth range may be a range of a depth deeper than that of the specific object in the image, and image segments obtained from the weather texture image corresponding to the second depth range may be simulated as if displayed behind the specific object. As such, the server 2000 may determine a shape of the image segments to be cut out from the weather texture image corresponding to the second depth range, in such a manner that the image segments do not overlap with the specific object in the image.

Alternatively, the server 2000 may control transparency or mask a part of a cut image segment in such a manner that the cut image segment does not overlap with the specific object in the image. In this case, the server 2000 may determine an area of the cut image segment to be transparent or masked, based on an area occupied by the object nearer than the cut image segment. A level of the transparency may be controlled.

For example, when the weather texture image corresponding to the second depth range is a rain texture image corresponding to rainy weather, the server 2000 may set criteria for a part of the rain texture image from which the image segments are to be obtained, based on at least one of precipitation, wind speed, or wind direction. The server 2000 may set intervals between the image segments to be obtained, based on at least one of precipitation, wind speed, or wind direction. The server 2000 may set a simulation cycle for sequentially simulating the image segments, based on the depth range of the weather texture image. For example, the second depth range may be a depth range deeper than the first depth range, and the image segments obtained from the weather texture image corresponding to the second depth range may be simulated in the image in a cycle longer than that of the image segments obtained from the weather texture image corresponding to the first depth range.

Figure 12:
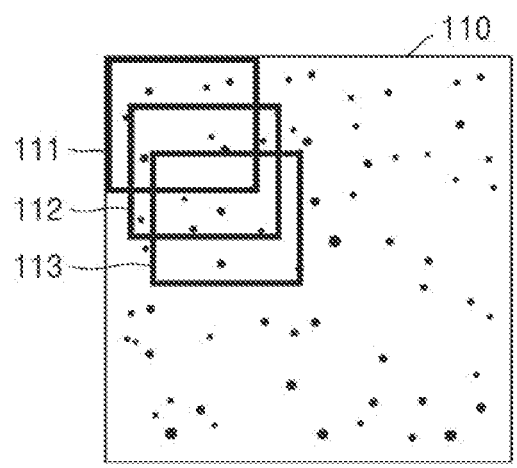
FIG. 12 is a schematic diagram illustrating examples of locations of and intervals between image segments to be cut out from a weather texture image, according to an embodiment of the disclosure.

FIG. 12 is a schematic diagram illustrating examples of locations of and intervals between image segments to be cut out from a weather texture image, according to an embodiment of the disclosure.

Figure 13:
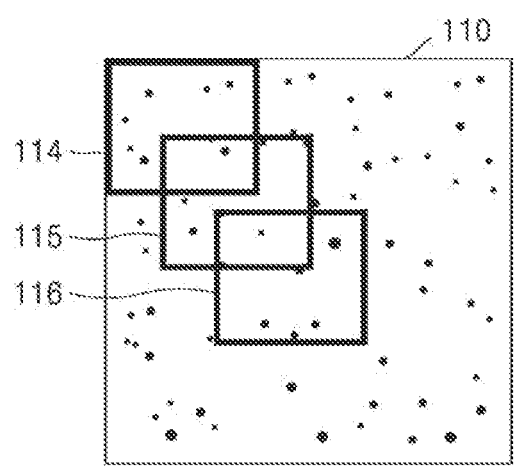
FIG. 13 is a schematic diagram illustrating examples of locations of and intervals between image segments to be cut out from a weather texture image, according to an embodiment of the disclosure.

FIG. 13 is a schematic diagram illustrating examples of locations of and intervals between image segments to be cut out from a weather texture image, according to an embodiment of the disclosure.

Referring to FIG. 12, image segments 111, 112, and 113 may be cut out from a rain texture image 110 and, referring to FIG. 13, image segments 114, 115, and 116 may be cut out from the rain texture image 110. A cutting direction of and intervals between image segments to be cut out from the rain texture image 110 may be adjusted based on precipitation, wind direction, and wind speed. For example, when the precipitation, the wind direction, and the wind speed are low, the image segments 111, 112, and 113 may be selected at small intervals along a direction close to a vertical direction of the rain texture image 110. Otherwise, when the precipitation and the wind speed are high, the image segments 114, 115, and 116 may be selected at large intervals along a diagonal direction of the rain texture image 110.

Figure 14:
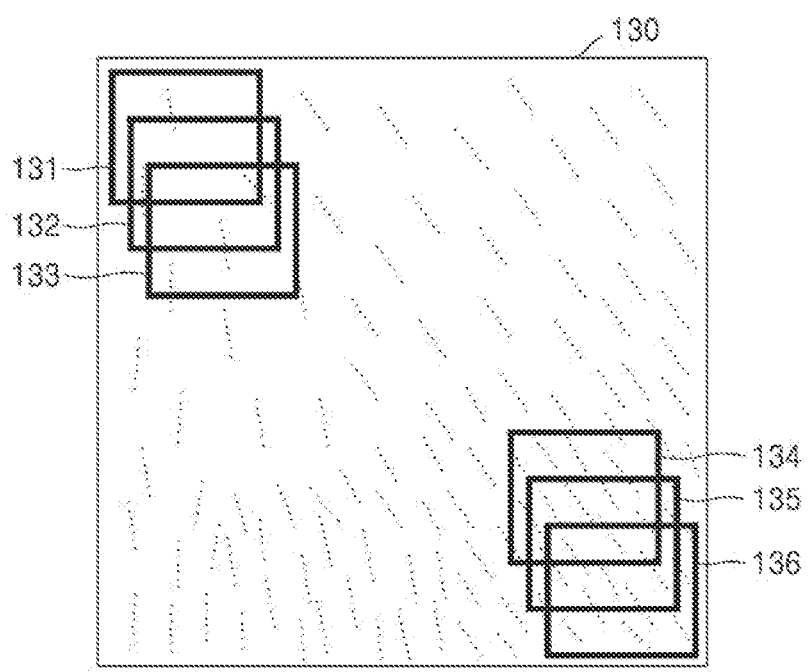
FIG. 14 is a schematic diagram illustrating an example of cutting out image segments from different locations of a weather texture image based on weather, according to an embodiment of the disclosure.

FIG. 14 is a schematic diagram illustrating an example of selecting image segments from different locations of a weather texture image based on weather, according to an embodiment of the disclosure.

Referring to FIG. 14, raindrops having different shapes may be placed at various densities in a rain texture image 130. For example, raindrops may be placed in a vertical direction at a left part of the rain texture image 130, and raindrops may be placed in a diagonal direction at a right part of the rain texture image 130. For example, raindrops may be placed at a low density at a top part of the rain texture image 130, and raindrops may be placed at a high density at a bottom part of the rain texture image 130.

As such, when the rainfall and the wind speed are low, selection criteria may be set to select image segments 131, 132, and 133 from a top left part of the rain texture image 130. Otherwise, when the rainfall and the wind speed are high, selection criteria may be set to select image segments 134, 135, and 136 from a bottom right part of the rain texture image 130.

Figure 15:
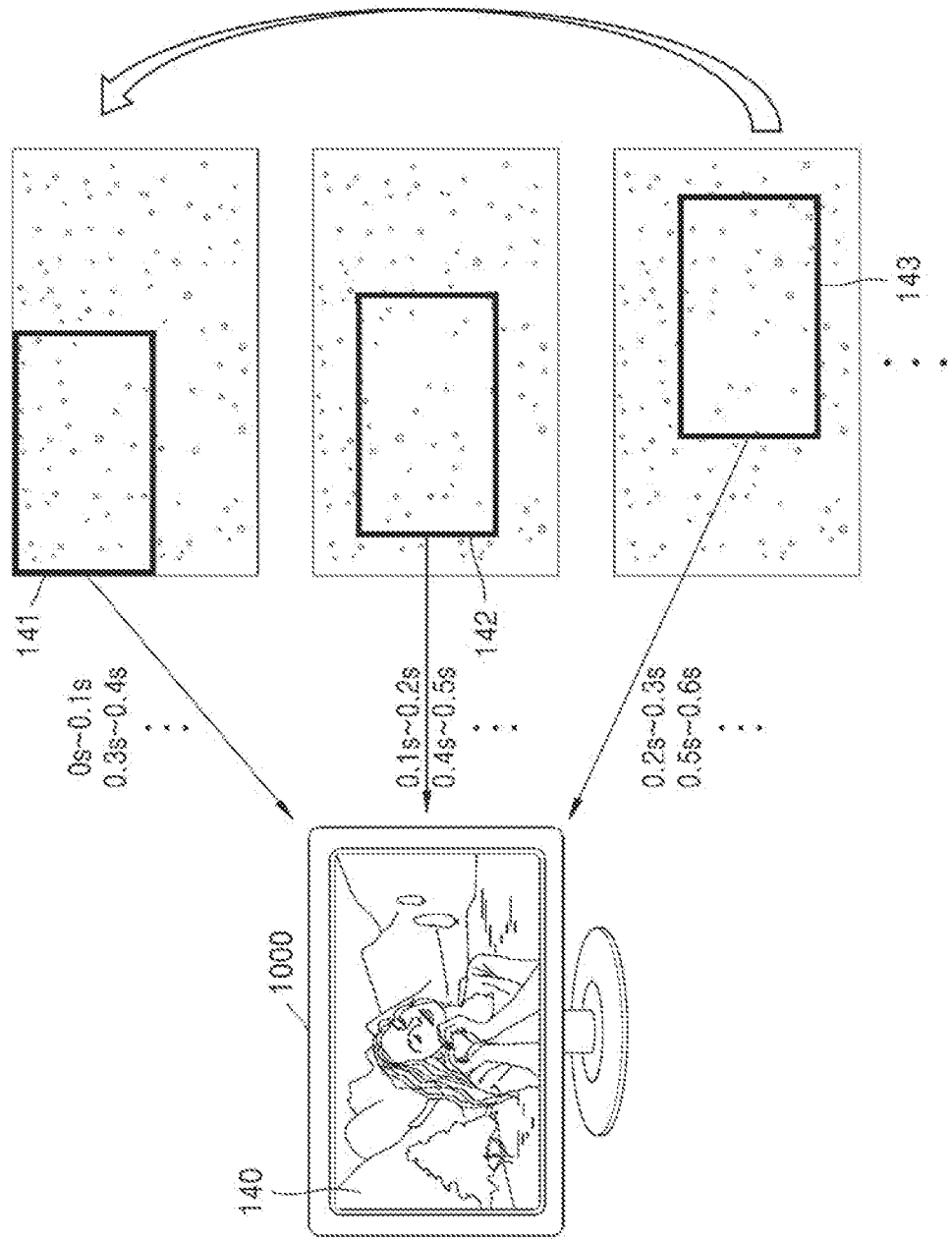
FIG. 15 is a schematic diagram illustrating an example of sequentially simulating image segments in a specific cycle, according to an embodiment of the disclosure.

FIG. 15 is a schematic diagram illustrating an example of sequentially simulating image segments in a specific cycle, according to an embodiment of the disclosure.

Referring to FIG. 15, image segments 141, 142, and 143 may be sequentially and repeatedly reproduced on an image 140. A cycle for overlaying the image segments 141, 142, and 143 may be preset based on a depth range of the image segments 141, 142, and 143. For example, the image segment 141 may be overlaid on the image 140 from 0 second to 0.1 second, and then the image segment 142 may be overlaid on the image 140 from 0.1 second to 0.2 seconds. The image segment 143 may be overlaid on the image 140 from 0.2 seconds to 0.3 seconds, and then the image segment 141 may be overlaid on the image 140 from 0.3 seconds to 0.4 seconds. A transparency of the overlaid image segments 141, 142, 143 may be controlled, for example based on depths of objects in the image.

A snow effect or other weather effect may be provided in the image 140 by sequentially and repeatedly overlaying the image segments 141, 142, and 143 on the image 140 in a certain cycle.

Figure 16:
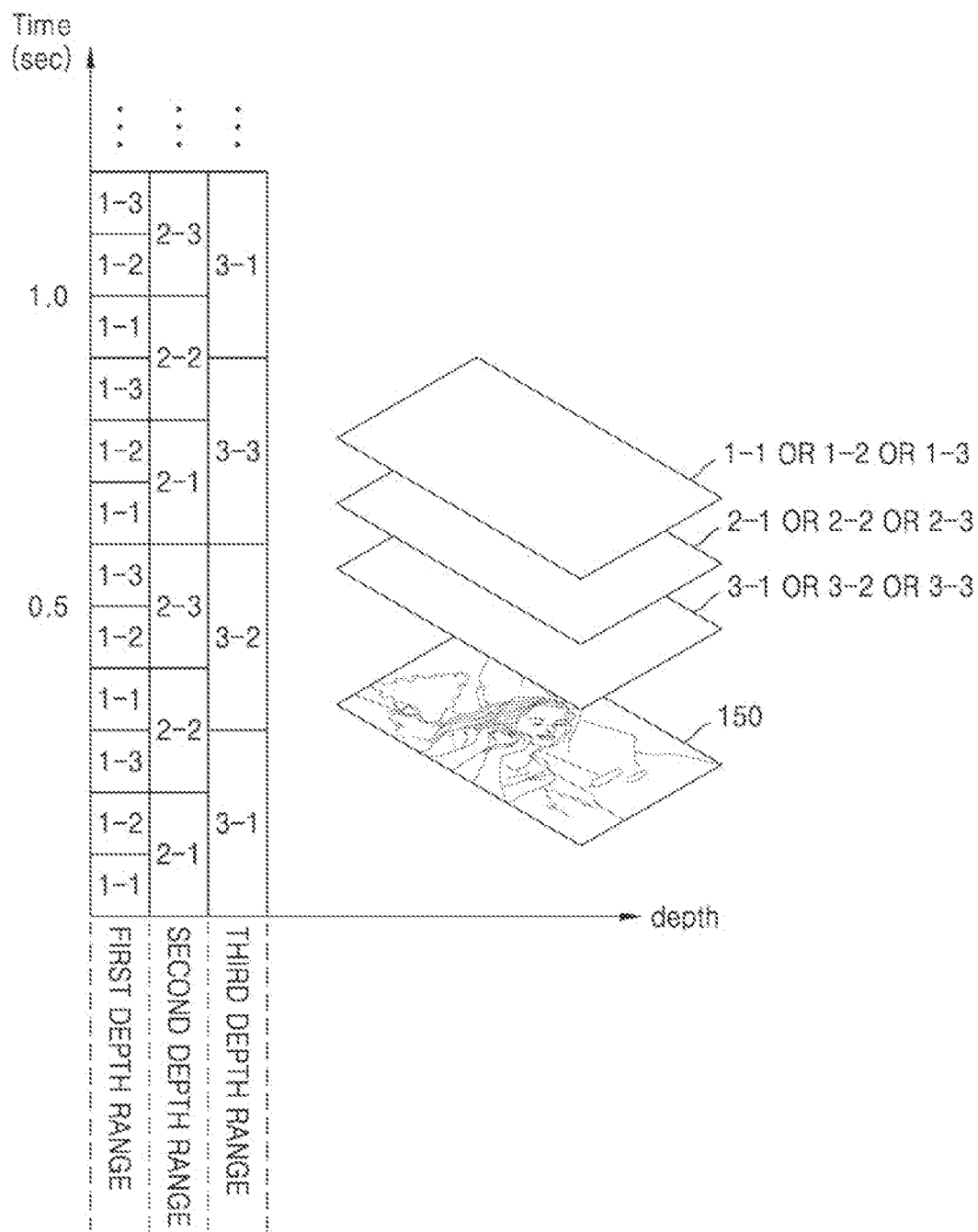
FIG. 16 is a schematic diagram illustrating an example of simulating image segments in different cycles based on depth ranges, according to an embodiment of the disclosure.

FIG. 16 is a schematic diagram illustrating an example of simulating image segments in different cycles based on depth ranges, according to an embodiment of the disclosure.

Referring to FIG. 16, one of first image segments 1-1, 1-2, and 1-3 obtained from a weather texture image of a first depth range, one of second image segments 2-1, 2-2, and 2-3 obtained from a weather texture image of a second depth range, and one of third image segments 3-1, 3-2, and 3-3 obtained from a weather texture image of a third depth range may be incorporated together on an image 150.

The first depth range may be a depth range shallower than the second depth range, and the second depth range may be a depth range shallower than the third depth range.

The first image segments 1-1, 1-2, and 1-3 obtained from the weather texture image of the first depth range may be sequentially overlapped on the image 150 in a cycle of 0.1 second. The second image segments 2-1, 2-2, and 2-3 obtained from the weather texture image of the second depth range may be sequentially overlapped on the image 150 in a cycle of 0.2 seconds. The third image segments 3-1, 3-2, and 3-3 obtained from the weather texture image of the third depth range may be sequentially overlapped on the image 150 in a cycle of 0.3 seconds.

In this case, at least parts of the first image segments 1-1, 1-2, and 1-3, the second image segments 2-1, 2-2, and 2-3, and the third image segments 3-1, 3-2, and 3-3 may be transparent or masked based on locations and depths of objects in the image 150.

The first image segments 1-1, 1-2, and 1-3, the second image segments 2-1, 2-2, and 2-3, and the third image segments 3-1, 3-2, and 3-3 may be images on which weather objects of different sizes are displayed. The first image segments 1-1, 1-2, and 1-3, the second image segments 2-1, 2-2, and 2-3, and the third image segments 3-1, 3-2, and 3-3 may be overlaid in different cycles, and thus a realistic 3D weather effect may be provided in the image 150.

Figure 17:
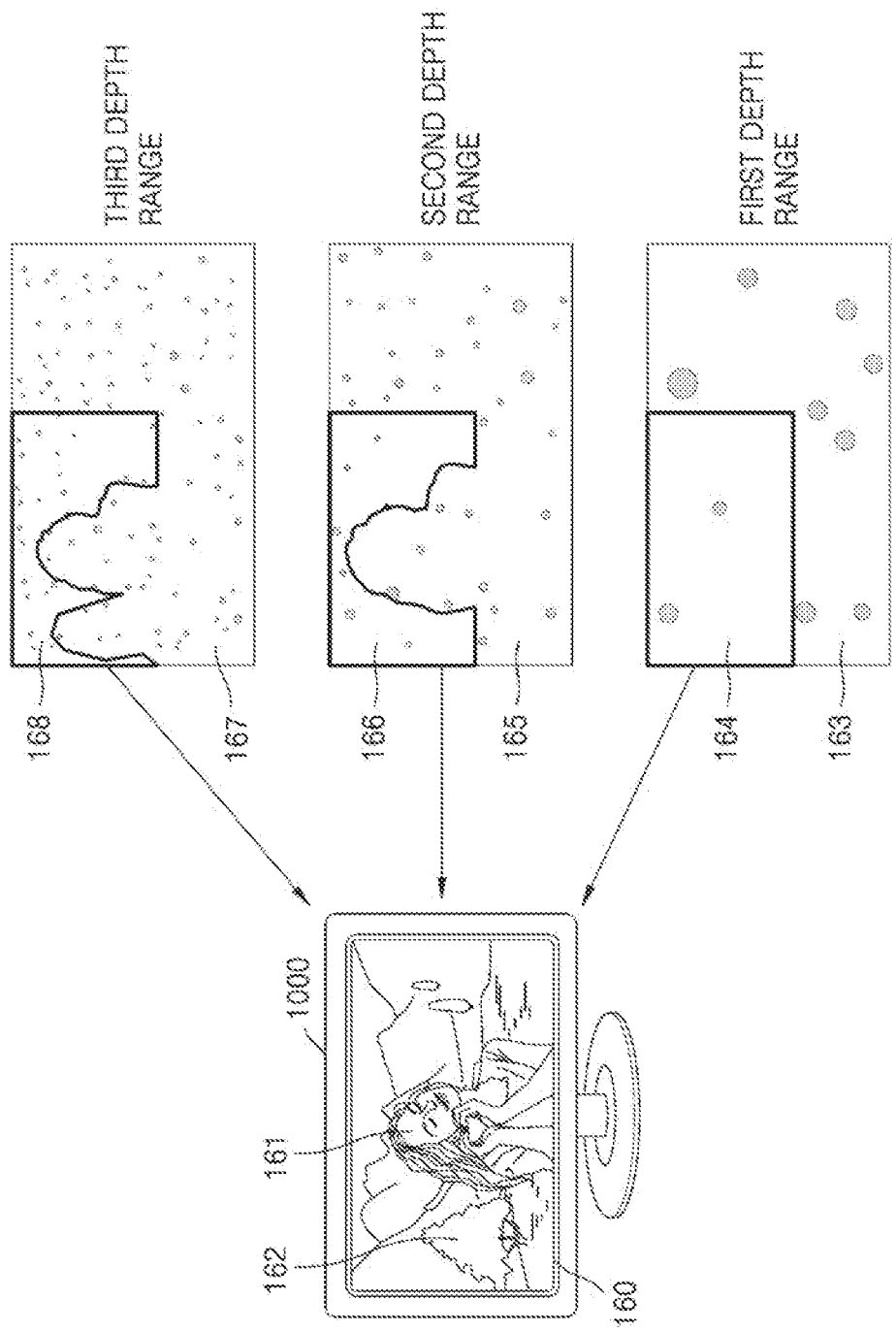
FIG. 17 is a schematic diagram illustrating an example of cutting out image segments in different shapes based on depth ranges, according to an embodiment of the disclosure.

FIG. 17 is a schematic diagram illustrating an example of cutting out image segments in different shapes based on depth ranges, according to an embodiment of the disclosure.

Referring to FIG. 17, a first depth range may be a range of a depth shallower than those of first and second objects 161 and 162 in an image 160. For example, when depths of spaces in the image 160 range from 0 to 100, the first depth range may be a depth range of 0 to 40. An image segment 164 having the same size as the image 160 may be cut out from a weather texture image 163 corresponding to the first depth range.

A second depth range may be a range of a depth deeper than that of the first object 161 and shallower than that of the second object 162 in the image 160. For example, when the depths of the spaces in the image 160 range from 0 to 100, the second depth range may be a depth range of 40 to 70. An image segment 166 having a shape not overlapping with the first object 161 may be cut out from a weather texture image 165 corresponding to the second depth range.

A third depth range may be a range of a depth deeper than those of the first and second objects 161 and 162 in the image 160. For example, when the depths of the spaces in the image 160 range from 0 to 100, the third depth range may be a depth range of 70 to 100. An image segment 168 having a shape not overlapping with the first and second objects 161 and 162 may be cut out from a weather texture image 167 corresponding to the third depth range.

Figure 18:
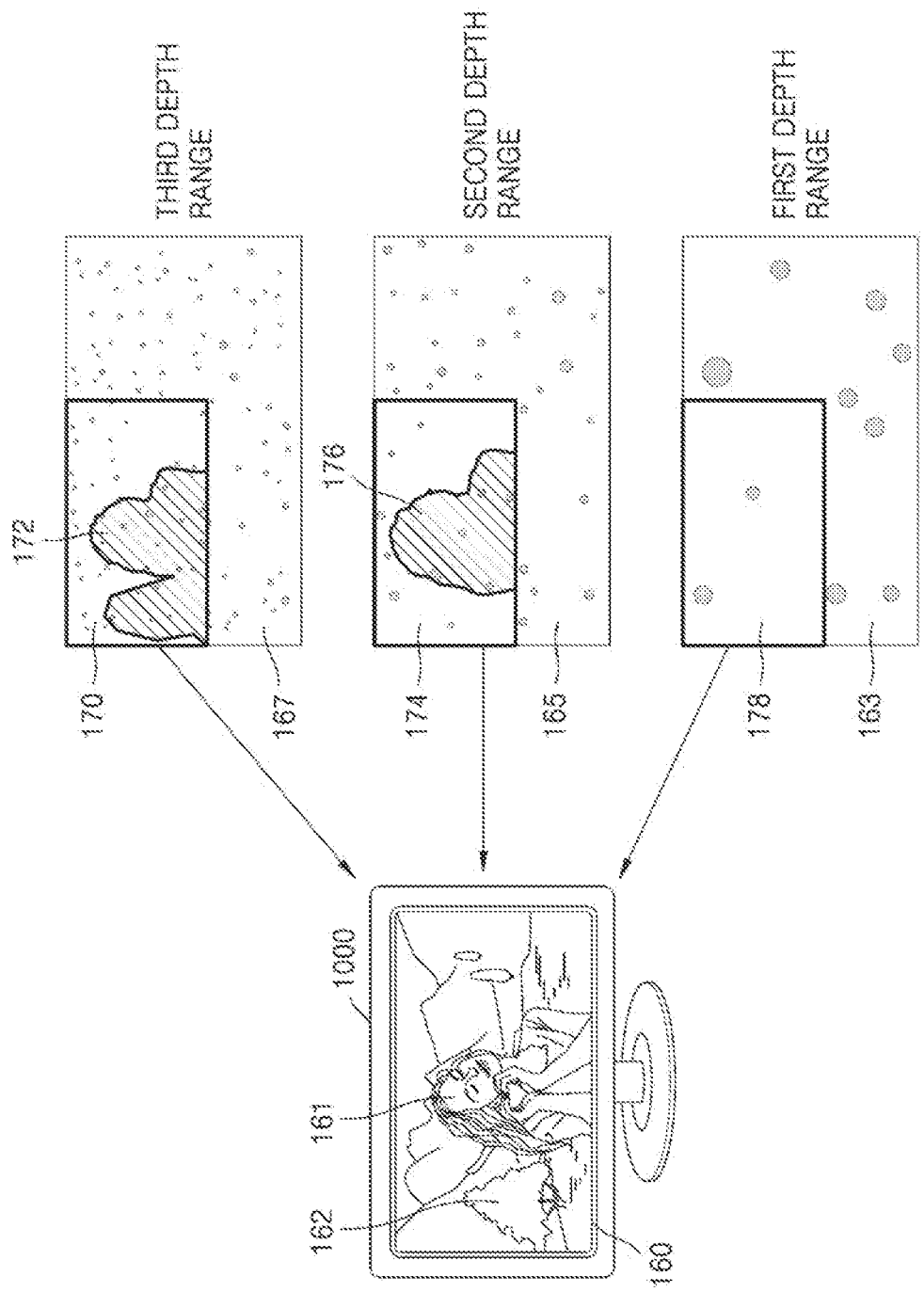
FIG. 18 is a schematic diagram illustrating an example of masking or adjusting transparencies of parts of image segments based on depth ranges, according to an embodiment of the disclosure.

FIG. 18 is a schematic diagram illustrating an example of masking or adjusting transparencies of parts of image segments based on depth ranges, according to an embodiment of the disclosure.

Referring to FIG. 18, image segments 170, 174, and 178 may be selected in a rectangular shape. The shape of the image segments 170, 174, and 178 is not limited, and may be any shape including square, circle, and irregular shapes. The shape of the image segment may correspond to a shape of an object in the image into which the image segment is to be overlaid.

In this case, because the image segment 170 corresponds to a third depth range, an area 172 of the image segment 170, which overlaps with objects having depths shallower than the third depth range, may be masked. Alternatively, the area 172 of the image segment 170 may be made transparent.

Because the image segment 174 corresponds to a second depth range, an area 176 of the image segment 174, which overlaps with an object having a depth shallower than the second depth range, may be masked. Alternatively, the area 176 of the image segment 174 may be made transparent.

FIG. 19 is a table showing an example of information provided to the device 1000 to simulate a weather effect, according to an embodiment of the disclosure.

Referring to FIG. 19, object recognition information, space information, criteria information, etc. may be provided to the device 1000.

A request parameter is an example of the criteria information required to simulate a weather effect, and may include an identifier of the weather effect (e.g., effect id), an identifier of an image (e.g., image_num), and information indicating criteria for simulating the weather effect (e.g., effect-information). The request parameter may be a fixed value, and may be included in a JavaScript object notation (Json)-type file.

Images may include an image to which the weather effect is to be applied. The image to which the weather effect is to be applied may include an original image, an image converted based on time, and an image converted based on season, but the image is not limited thereto.

A depth map is an example of the space information indicating depths of spaces in the image, and may be a map file generated through depth prediction by using a second artificial intelligence model. The depth map may be generated by recognizing a 3D space from a 2D image and expressing distance values of pixels in the image, in the form of a map.

A segmentation map is an example of the object recognition information indicating objects recognized in the image, and may be a map file generated though semantic image segmentation by using the first artificial intelligence model.

Texture may indicate a weather texture image used to provide the weather effect.

The server 2000 may provide the request parameter, the depth map, and the segmentation map to the device 1000, and may not provide the image to which the weather effect is to be applied, and the weather texture image to the device 1000. In this case, the server 2000 may provide, to the device 1000, link information for downloading the image to which the weather effect is to be applied, and link information for downloading the weather texture image. The server 2000 may transmit, to the device 1000, a compressed file generated by compressing at least a part of the data of FIG. 19.

Figure 20:
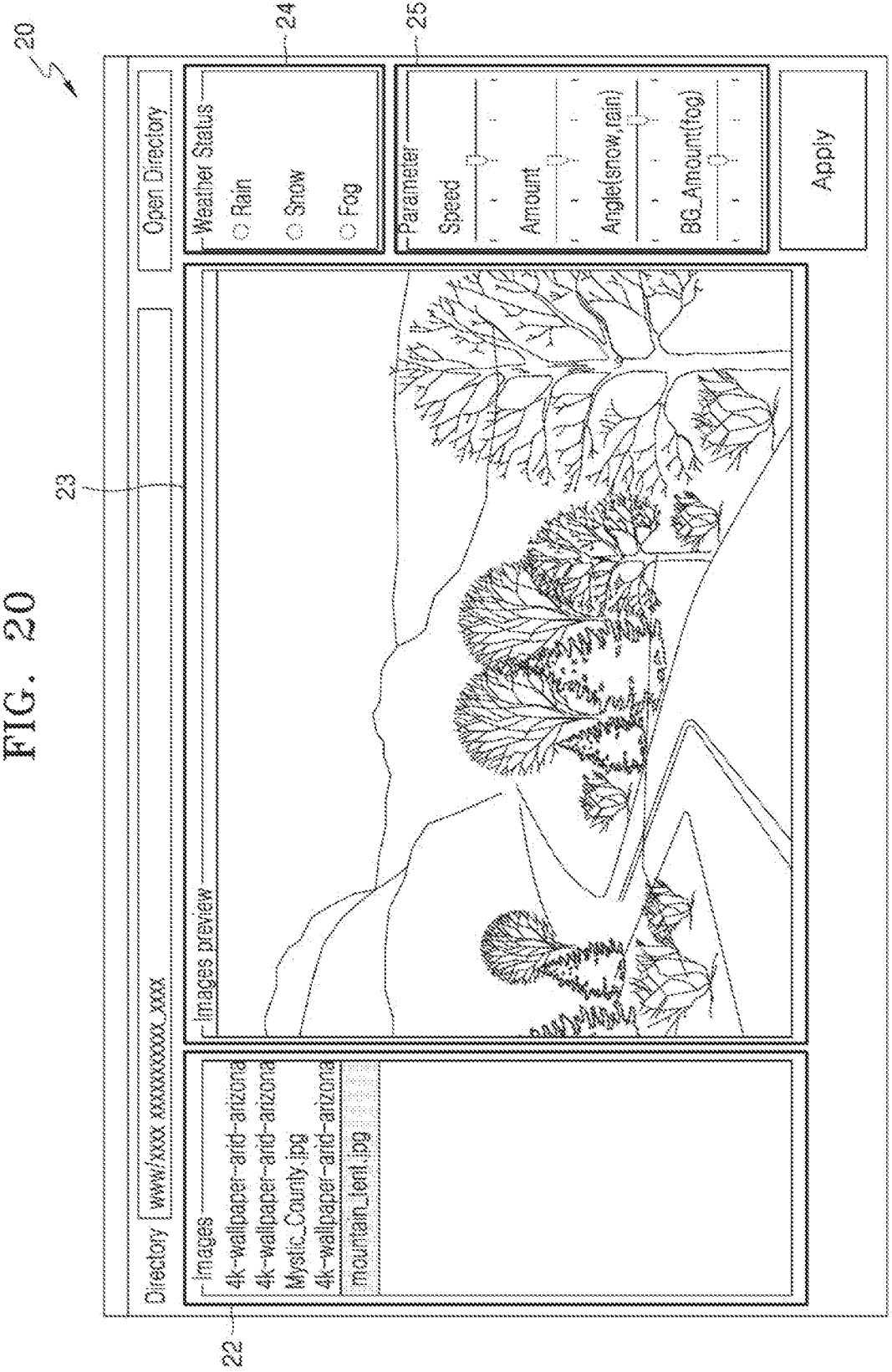
FIG. 20 is an image of a graphical user interface (GUI) for setting criteria for simulating a weather effect, according to an embodiment of the disclosure.

FIG. 20 is an image of a GUI 20 for setting criteria for simulating a weather effect, according to an embodiment of the disclosure.

Through the GUI 20 of FIG. 20, a user of the device 1000 or an operator of the server 2000 may set criteria for simulating a weather effect. The GUI 20 of FIG. 20 may be provided through a web-based service to the device 1000. Referring to FIG. 20, the GUI 20 for setting the criteria for simulating the weather effect may include an area 22 for selecting an image to which the weather effect is to be applied, an area 23 where a preview image to which the weather effect is applied is displayed, an area 24 for selecting a type of weather, and an area 25 for setting parameters for the weather effect.

A list of images stored in the device 1000 and a list of images stored in the server 2000 may be displayed in the area 22 for selecting the image to which the weather effect is to be applied.

When the list of images stored in the server 2000 is displayed in the area 22 for selecting the image to which the weather effect is to be applied, the server 2000 may recommend images related to current weather. The server 2000 may classify the images stored in the server 2000, based on weather. The server 2000 may receive weather information related to the current weather, from a weather service provider server and recommend images corresponding to the current weather, to the device 1000 based on the received weather information.

The server 2000 may recommend the images corresponding to the current weather, to the device 1000 considering a time and a region where the device 1000 is located. In this case, the server 2000 may classify the images based on locations and times.

When the list of images stored in the device 1000 is displayed in the area 22 for selecting the image to which the weather effect is to be applied, the device 1000 may recommend images related to the current weather. The device 1000 may classify the images stored in the device 1000, based on weather. The device 1000 may receive weather information related to the current weather, from a weather service provider server and recommend images corresponding to the current weather, to a user based on the received weather information.

The GUI 20 may be provided through a certain application programming interface (API) to the device 1000.

Identifiers of weather effects applicable to the image may be displayed in the area 24 for selecting the type of weather. For example, identifiers indicating rain, snow, and fog effects may be displayed in the area 24.

Values indicating properties of the weather effect may be displayed in the area 25 for setting the parameters for the weather effect. For example, values for setting a speed, an amount, and an angle of weather objects may be displayed in the area 25.

A preview image in which the weather effect is reflected may be displayed in the area 23. A preview image showing a result of simulating a weather effect selected in the area 24, in the image based on properties selected in the area 25 may be displayed in the area 23 in real time.

Figure 21:
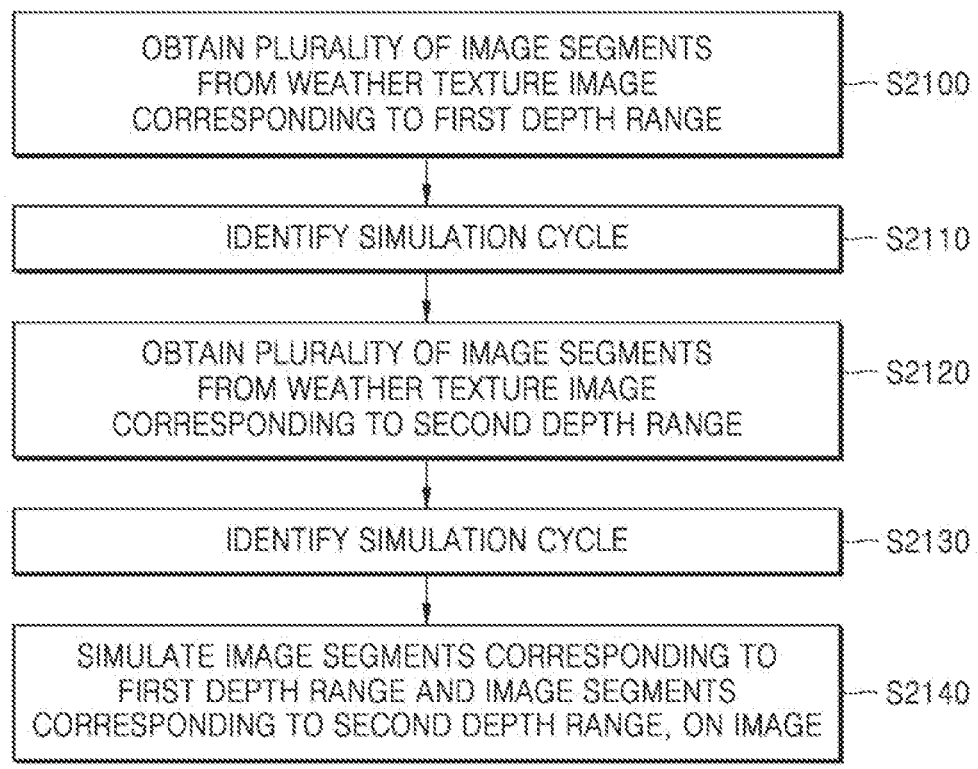
FIG. 21 is a flowchart of a method, performed by a device, of simulating a weather effect in an image by using weather texture images, according to an embodiment of the disclosure.

FIG. 21 is a flowchart of a method, performed by the device 1000, of simulating a weather effect in an image by using weather texture images, according to an embodiment of the disclosure.

In operation S2100, the device 1000 may obtain a plurality of image segments from a weather texture image corresponding to a first depth range. The device 1000 may obtain weather information indicating current weather, and identify properties of the current weather. The device 1000 may identify locations of image segments and intervals between the image segments according to the properties of the current weather, based on criteria information for simulating a weather effect. The device 1000 may obtain the plurality of image segments from the weather texture image, based on the identified locations and intervals.

In operation S2110, the device 1000 may identify a simulation cycle. The device 1000 may identify the simulation cycle according to the properties of the current weather and the first depth range, based on the criteria information for simulating the weather effect.

In operation S2120, the device 1000 may obtain a plurality of image segments from a weather texture image corresponding to a second depth range. The device 1000 may identify locations of image segments and intervals between the image segments according to the properties of the current weather, based on the criteria information for simulating the weather effect. The device 1000 may select the plurality of image segments from the weather texture image, based on the identified cutting locations and intervals. When an object is present in an image at a depth shallower than the second depth range, the device 1000 may control the image segments not to overlap with the object in the image.

In operation S2130, the device 1000 may identify a simulation cycle. The device 1000 may identify the simulation cycle according to the properties of the current weather and the second depth range, based on the criteria information for simulating the weather effect.

In operation S2140, the device 1000 may simulate the image segments corresponding to the first depth range and the image segments corresponding to the second depth range, in the image. The device 1000 may overlap one of a plurality of image segments corresponding to the first depth range and one of a plurality of image segments corresponding to the second depth range, together on the image.

Figure 22:
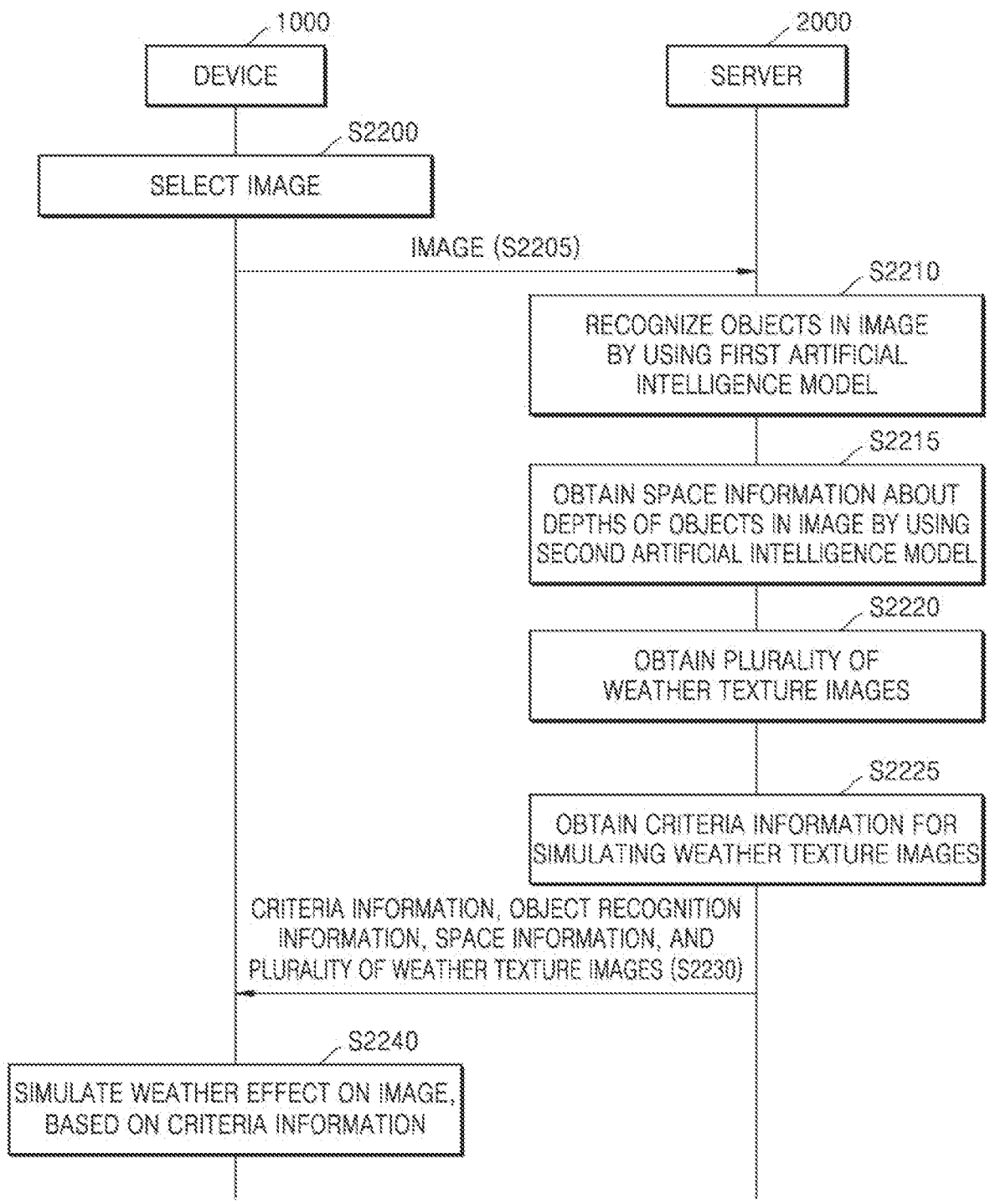
FIG. 22 is a flowchart of a method, performed by a device of a system, of simulating a weather effect in an image by using weather texture images received from a server, according to an embodiment of the disclosure.

FIG. 22 is a flowchart of a method, performed by the device 1000 of the system, of simulating a weather effect in an image by using weather texture images received from the server 2000, according to an embodiment of the disclosure.

Operations S2200 to S2215 of FIG. 22 correspond to operations S300 to S315 of FIG. 3, and thus a redundant description thereof is omitted.

In operation S2220, the server 2000 may obtain a plurality of weather texture images. The server 2000 may obtain, from a database, a plurality of weather texture images pre-registered per weather condition. The server 2000 may obtain, for example, a plurality of weather texture images indicating rainy weather, a plurality of weather texture images indicating snowy weather, and a plurality of weather texture images indicating foggy weather. The plurality of weather texture images pre-registered per weather may respectively correspond to depth ranges. The plurality of weather texture images pre-registered per weather may differ from each other based on the depth ranges. The depth ranges may be values for defining ranges of depths of spaces in an image.

In operation S2220, the server 2000 may obtain criteria information for simulating a weather effect. The server 2000 may determine, for example, criteria for a weather texture image to be used based on weather, criteria for a part of the weather texture image from which image segments are to be cut out, criteria for intervals between the image segments, and criteria for a time during which the image segments are displayed based on a depth range. In operation S2230, the server 2000 may provide the criteria information about the determined criteria, object recognition information, space information, and the plurality of weather texture images to the device 1000. The device 1000 may pre-store the plurality of weather texture images related to various types of weather, and select and use at least one weather texture image appropriate for current weather and a selected image, from among the plurality of pre-stored weather texture images.

In operation S2240, the device 1000 may simulate a weather effect in the image, based on the criteria information. The device 1000 may select a weather texture image based on the current weather and a depth of an object and a space in the image. The device 1000 may obtain a plurality of image segments from the selected weather texture image and sequentially incorporate the plurality of image segments on the image in a certain cycle.

Figure 23:
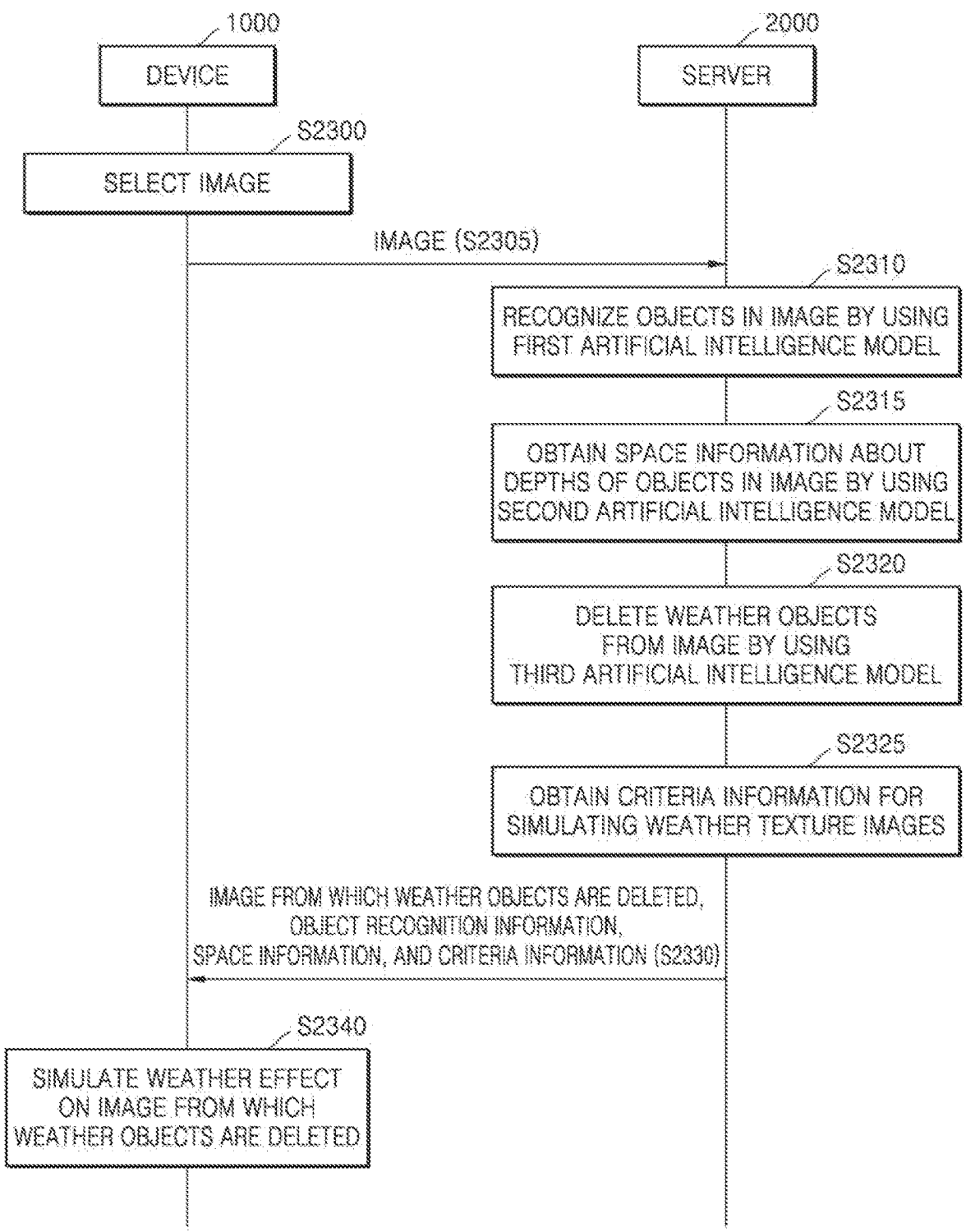
FIG. 23 is a flowchart of a method, performed by a system, of simulating a weather effect in an image from which weather objects are deleted, according to an embodiment of the disclosure.

FIG. 23 is a flowchart of a method, performed by the system, of simulating a weather effect in an image from which weather objects are deleted, according to an embodiment of the disclosure.

Operations S2300 to S2315, and S2325 correspond to operations S2200 to S2215, and S2225 of FIG. 22, and thus a redundant description thereof is omitted.

In operation S2320, the server 2000 may delete weather objects from an image by using a third artificial intelligence model. The server 2000 may obtain the image from which the weather objects are deleted, by inputting the image to the third artificial intelligence model for deleting the weather objects in the image. The third artificial intelligence model may be a model pre-trained to delete the weather objects in the image and may be, for example, a model based on an artificial neural network.

In operation S2330, the server 2000 may provide the image from which the weather objects are deleted, object recognition information, space information, and a plurality of weather texture images to the device 1000.

In operation S2340, the device 1000 may simulate a weather effect in the image from which the weather objects are deleted. The device 1000 may select a weather texture image based on current weather and a depth of an object and a space in the image. The device 1000 may obtain a plurality of image segments from the selected weather texture image and sequentially overlap the plurality of image segments in a certain cycle on the image from which the weather objects are deleted.

Figure 24:
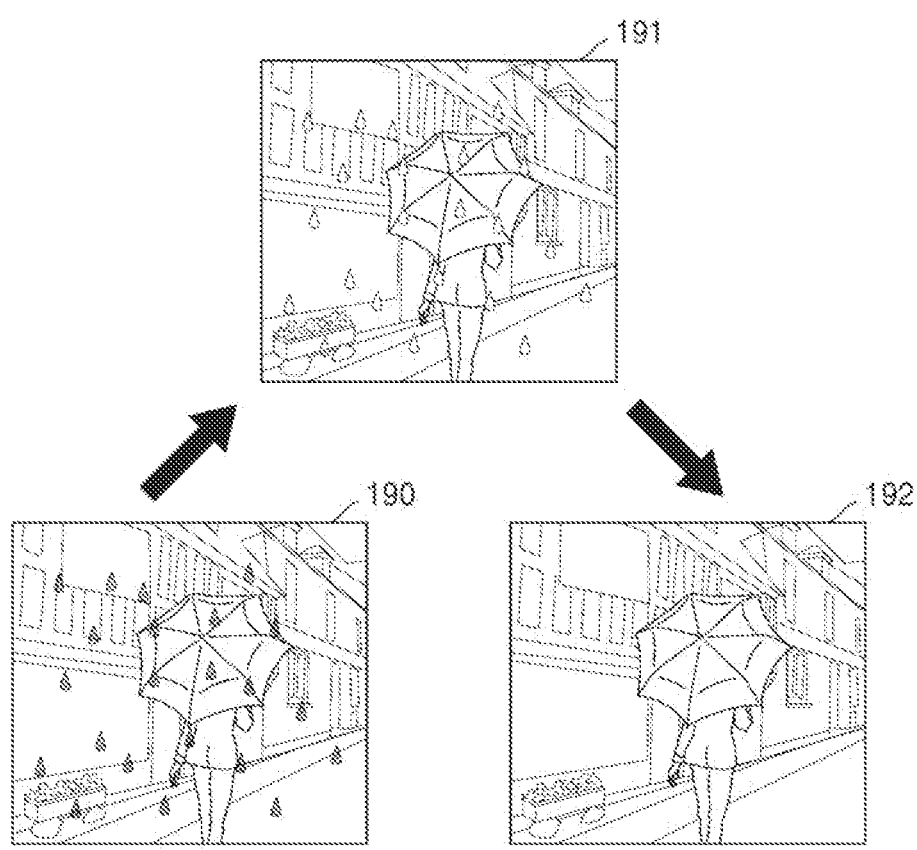
FIG. 24 is a schematic diagram illustrating an example of an image from which weather objects are deleted, according to an embodiment of the disclosure.

FIG. 24 is a schematic diagram illustrating an example of an image from which weather objects are deleted, according to an embodiment of the disclosure.

Referring to FIG. 24, a picture 190 taken in rainy weather includes raindrops. When the picture 190 including the raindrops is input to a third artificial intelligence model, a picture 192 from which the raindrops are deleted may be output from the third artificial intelligence model. A picture 191 including empty raindrops may be generated by deleting the raindrops from the picture 190 including the raindrops, and the picture 192 from which the raindrops are deleted may be generated by completely omitting the raindrops from the image.

Figure 25:
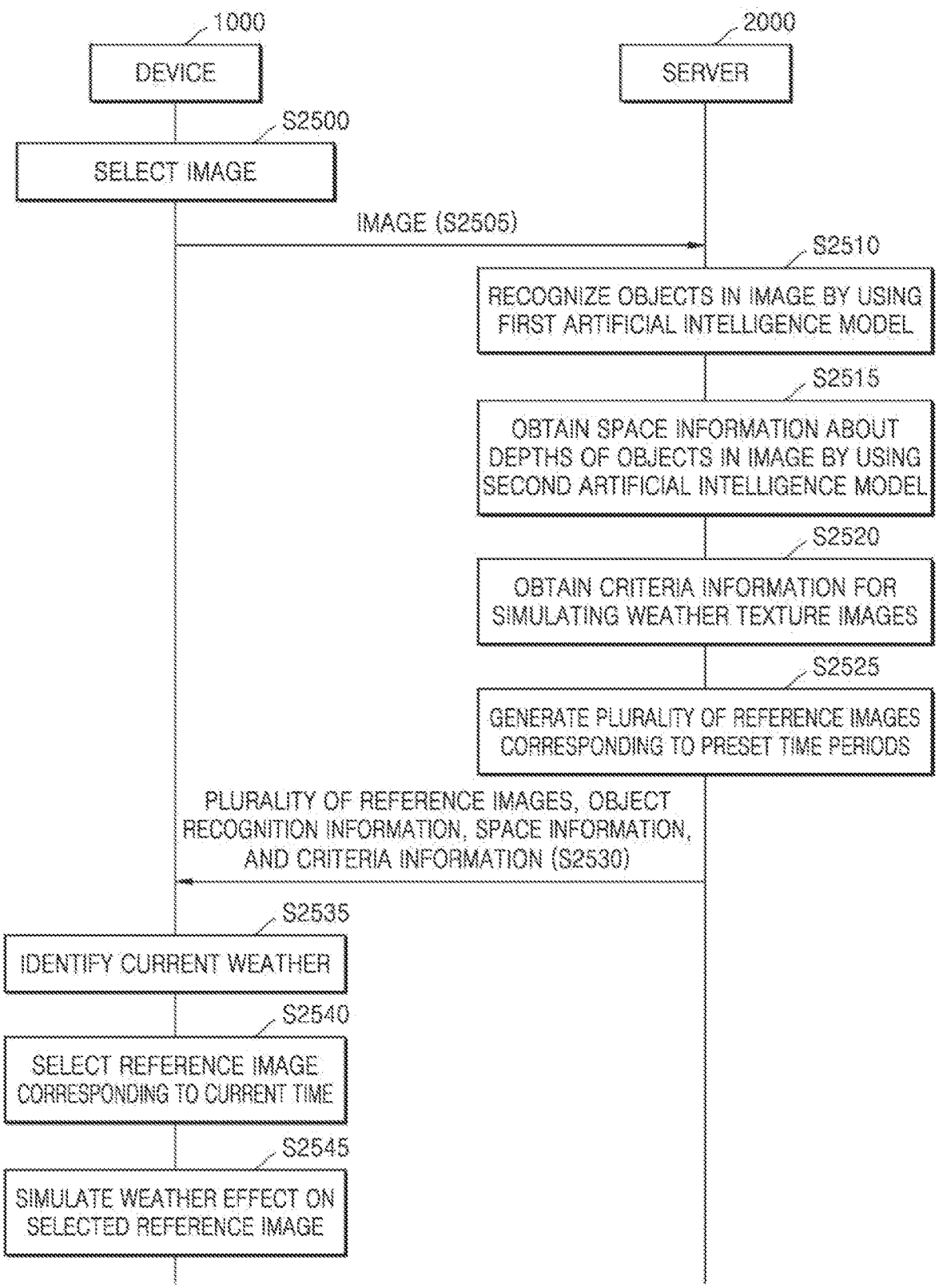
FIG. 25 is a flowchart of a method, performed by a system, of simulating a weather effect in a reference image corresponding to a current time, according to an embodiment of the disclosure.

FIG. 25 is a flowchart of a method, performed by the system, of simulating a weather effect in a reference image corresponding to a current time, according to an embodiment of the disclosure.

Operations S2500 to S2520 correspond to operations S900 to S920 of FIG. 9, and thus a redundant description thereof is omitted.

In operation S2525, the server 2000 may generate a plurality of reference images corresponding to preset time periods. The server 2000 may generate, for example, a reference image corresponding to morning, a reference image corresponding to afternoon, a reference image corresponding to evening, and a reference image corresponding to night, by changing colors of an image or other objects in the image or characteristics of the image that are indicative of a time of day, such as brightness, lighting, etc.

In operation S2530, the server 2000 may provide the plurality of reference images, object recognition information, space information, and criteria information to the device 1000.

In operation S2535, the device 1000 may identify a current time.

In operation S2540, the device 1000 may select a reference image corresponding to the current time. The device 1000 may select the reference image corresponding to the current time, from among the reference images received from the server 2000. For example, when the current time is 13:00, the device 1000 may select the reference image corresponding to afternoon.

In operation S2545, the device 1000 may simulate a weather effect in the selected reference image.

FIG. 26 is a schematic diagram illustrating an example of reference images corresponding to preset time periods, according to an embodiment of the disclosure.

Referring to FIG. 26, a reference image corresponding to morning, a reference image corresponding to afternoon, a reference image corresponding to evening, and a reference image corresponding to night may be generated using an image.

Figure 27:
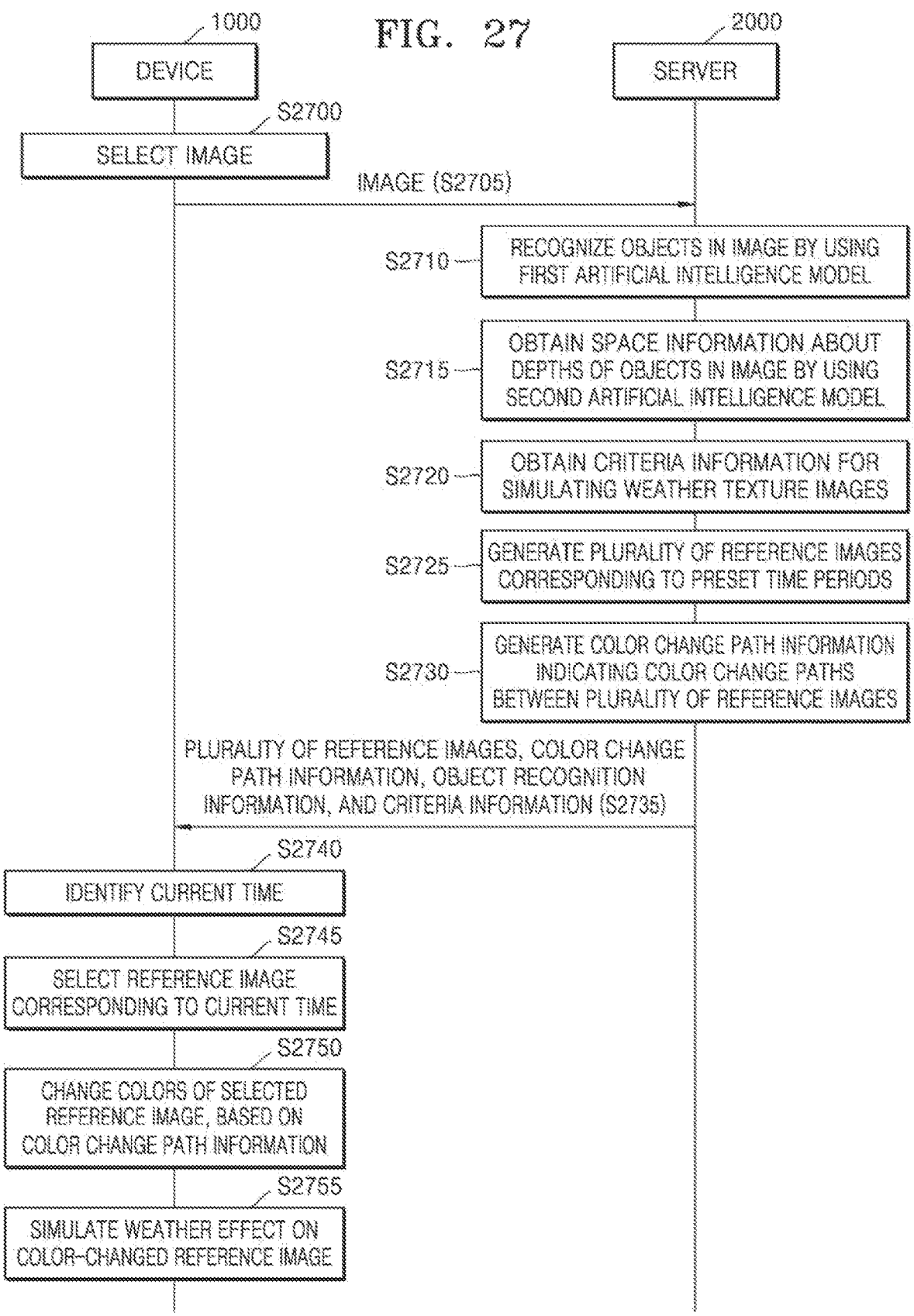
FIG. 27 is a flowchart of a method, performed by a system, of changing colors of a reference image based on color change paths and simulating a weather effect in the color-changed reference image, according to an embodiment of the disclosure.

FIG. 27 is a flowchart of a method, performed by the system, of changing colors of a reference image based on color change paths and simulating a weather effect in the color-changed reference image, according to an embodiment of the disclosure.

Operations S2700 to S2720 correspond to operations S900 to S920 of FIG. 9, and thus a redundant description thereof is omitted.

In operation S2725, the server 2000 may generate a plurality of reference images corresponding to preset time periods. The server 2000 may generate, for example, a reference image corresponding to morning, a reference image corresponding to afternoon, a reference image corresponding to evening, and a reference image corresponding to night, by changing colors of an image.

In operation S2730, the server 2000 may generate color change path information indicating color change paths between the plurality of reference images. The server 2000 may change a first reference image into a second reference image in such a manner that colors of the first reference image are smoothly changed into colors of the second reference image. To this end, the server 2000 may generate the color change path information by determining a path in which a color of a specific area of the first reference image is changed into a color of a specific area of the second reference image. The server 2000 may obtain the color change path information indicating the color change paths between the reference images, by inputting the plurality of reference images to a fourth artificial intelligence model. The fourth artificial intelligence model may be a model pre-trained to naturally change colors between the reference images considering properties of the reference images and may be, for example, a model based on an artificial neural network.

In operation S2735, the server 2000 may provide the plurality of reference images, the color change path information, object recognition information, space information, and criteria information to the device 1000.

In operation S2740, the device 1000 may identify a current time.

In operation S2745, the device 1000 may select a reference image corresponding to the current time. The device 1000 may select the reference image corresponding to the current time, from among the reference images received from the server 2000. The device 1000 may also select a reference image subsequent to the selected reference image. For example, when the current time is 13:00, the device 1000 may select the reference image corresponding to afternoon and the reference image corresponding to evening.

In operation S2750, the device 1000 may change colors of the selected reference image, based on the color change path information. For example, the server 2000 may gradually change colors of the reference image corresponding to afternoon, based on the color change path information between the reference image corresponding to afternoon and the reference image corresponding to evening.

In operation S2755, the device 1000 may simulate a weather effect in the color-changed reference image.

Figure 28:
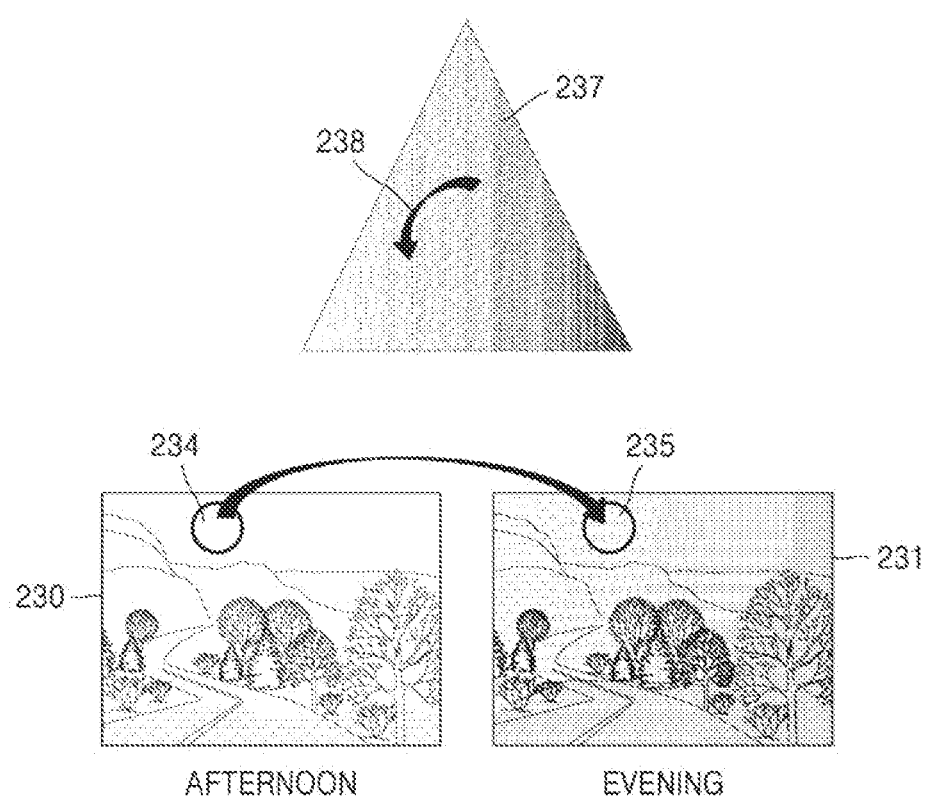
FIG. 28 is a schematic diagram illustrating an example of a color change path between reference images, according to an embodiment of the disclosure.

FIG. 28 is a schematic diagram illustrating an example of a color change path between reference images, according to an embodiment of the disclosure.

Referring to FIG. 28, color change path information about how colors of an afternoon reference image 230 need to be changed from the afternoon reference image 230 to an evening reference image 231 may be generated. Color change paths about how colors need to be changed between various areas of reference images may be determined.

For example, a path 238 about how a color of a specific area 234 in the afternoon reference image 230 needs to be changed into a color of a specific area 235 in the evening reference image 231 may be determined on a certain color chart 237. The specific area 234 in the afternoon reference image 230 may be an area at the same location as the specific area 235 in the evening reference image 231.

Although the server 2000 obtains object recognition information by using a first artificial intelligence model, obtains space information by using a second artificial intelligence model, deletes weather objects in an image, by using a third artificial intelligence model, and obtains color change path information between reference images by using a fourth artificial intelligence model in the above description, the disclosure is not limited thereto.

The device 1000 may store at least one of the first to fourth artificial intelligence models received from the server 2000, and obtain required data by using at least one of the first to fourth artificial intelligence models. In this case, the first to fourth artificial intelligence models may be implemented as software.

FIG. 29 is a schematic diagram illustrating an example of changing a color style of an image, according to an embodiment of the disclosure.

Referring to FIG. 29, an original image may be converted into images of various color styles. In this case, reference images related to specific color styles may be pre-registered and, when a registered reference image of a specific color style is selected, the original image may be converted based on the color style of the selected reference image.

FIG. 30 is a schematic diagram illustrating an example of an image in which a rain effect is reflected, according to an embodiment of the disclosure.

Referring to FIG. 30, the device 1000 may provide a weather effect caused when moving objects such as raindrops hit another object in an image, by using space information of the image. For example, the device 1000 may provide an effect of raindrops splashing onto the shoulders and arms of a person. The device 1000 may identify a location where the person is displayed, by using the space information of the image and provide the effect of splashing raindrops based on a depth of a space where the person is displayed. The device 1000 may sequentially overlap image segments of a rain texture image and overlap segments of a weather texture image including splashing raindrops, at a timing when raindrops hit the body of the person. In this case, locations of the splashing raindrops may be determined using the space information of the image.

The device 1000 may display dense fog on a long-distance object and display light fog on a short-distance object. The device 1000 may provide a 3D image effect reflecting weather parameters, e.g., haze, mist, fog, or fog patches, or provide a 3D image effect related to fine dust or dust clouds.

Figure 31:
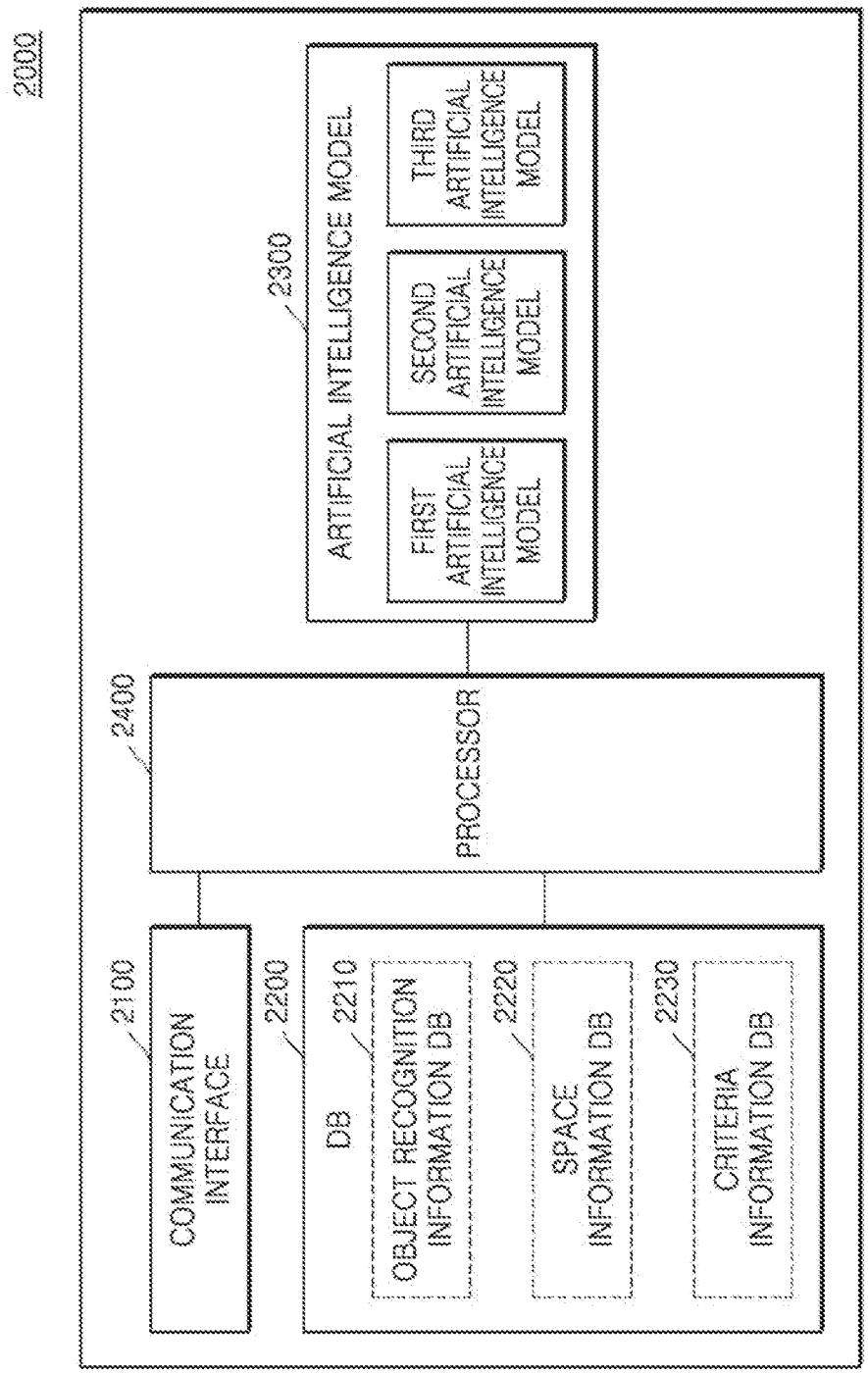
FIG. 31 is a block diagram of a server according to an embodiment of the disclosure.

FIG. 31 is a block diagram of the server 2000 according to an embodiment of the disclosure.

Referring to FIG. 31, the server 2000 according to an embodiment of the disclosure may include a communication interface 2100, a database (DB) 2200, an artificial intelligence model 2300, and a processor 2400. The DB 2200 may include an object recognition information DB 2210, a space information DB 2220, and a criteria information DB 2230.

The communication interface 2100 may include one or more elements for communicating with the device 1000. For example, the communication interface 2100 may include a short-range wireless communicator, a mobile communicator, and a wireless communicator. The communication interface 2100 may transmit or receive, to or from the device 1000, information required to simulate a weather effect in an image.

The device 1000 may store in memory a program for processing and control operations of the processor 2400, and store the information required to simulate the weather effect in the image. The DB 2200 may store, for example, images, weather texture images, object recognition information, space information, simulation criteria information, reference images, and color change path information. The object recognition information DB 2210 may store the object recognition information output from a first artificial intelligence model. The space information DB 2220 may store the space information output from a second artificial intelligence model. The criteria information DB 2230 may store information about various criteria for simulating the weather effect.

The artificial intelligence model 2300 may perform operations required to simulate the weather effect in the image. For example, the artificial intelligence model 2300 may include a first artificial intelligence model for recognizing objects in the image, a second artificial intelligence model for analyzing spaces in the image, and a third artificial intelligence model for deleting weather objects in the image. The artificial intelligence model 2300 may further include a fourth artificial intelligence model for generating color change path information indicating color change paths between reference images.

Functions related to artificial intelligence in the disclosure may be performed using a processor and a memory. The processor 2400 may include one or more processors. In this case, the one or more processors may be general-purpose processors such as a central processing unit (CPU), an application processor (AP), and a digital signal processor (DSP), dedicated graphics processors such as a graphics processing unit (GPU) and a vision processing unit (VPU), or dedicated artificial intelligence processors such as a numeric processing unit (NPU). The one or more processors control processing of input data based on a predefined operation rule or an artificial intelligence model stored in the memory. Alternatively, when the one or more processors are dedicated artificial intelligence processors, the dedicated artificial intelligence processors may be designed in a hardware structure specialized in processing of a specific artificial intelligence model.

The predefined operation rule or the artificial intelligence model is made through training. Herein, being made through training means that a basic artificial intelligence model is trained based on multiple pieces of training data by using a learning algorithm and thus a predefined operation rule or an artificial intelligence model configured to achieve desired characteristics (or purposes) is made. The training may be performed by a device having an artificial intelligence function according to the disclosure, or by a separate server and/or system. The learning algorithm may include, for example, supervised learning, unsupervised learning, semi-supervised learning, or reinforcement learning, but is not limited thereto.

The artificial intelligence model may include a plurality of neural network layers. Each of the plurality of neural network layers has a plurality of weight values and performs neural network calculation through calculation between a calculation result of a previous layer and the plurality of weight values. The plurality of weight values of the plurality of neural network layers may be optimized by a result of training the artificial intelligence model. For example, the plurality of weight values may be modified to reduce or minimize a loss value or a cost value obtained by the artificial intelligence model during the training process. An artificial neural network may include, for example, a CNN, a DNN, an RNN, an RBM, a DBN, a BRDNN, or a deep Q-network, but is not limited thereto.

The processor 2400 controls overall operations of the server 2000. The processor 2400 may control the communication interface 2100, the DB 2200, and the artificial intelligence model 2300 by executing programs stored in the device 1000. The processor 2400 may perform operations of the server 2000 described herein by controlling the communication interface 2100, the DB 2200, and the artificial intelligence model 2300.

Specifically, the processor 2400 may obtain an image selected by the device 1000 and recognize objects in the image by using the first artificial intelligence model.

The processor 2400 may obtain space information about depths of the objects in the image by using the second artificial intelligence model.

The processor 2400 may obtain a plurality of weather texture images. The processor 2400 may obtain, from the DB 2200, a plurality of weather texture images pre-registered per weather. The processor 2400 may obtain, for example, a plurality of weather texture images indicating rainy weather, a plurality of weather texture images indicating snowy weather, and a plurality of weather texture images indicating foggy weather. The plurality of weather texture images pre-registered per weather may respectively correspond to depth ranges. The plurality of weather texture images pre-registered per weather may differ from each other based on the depth ranges. The depth ranges may be values for defining ranges of depths of spaces in the image.

The processor 2400 may delete weather objects from the image by using the third artificial intelligence model.

The processor 2400 may determine criteria for simulating the plurality of weather texture images. The processor 2400 may determine, for example, criteria for a weather texture image to be used based on weather, criteria for a part of the weather texture image from which image segments are to be obtained, criteria for intervals between the image segments, and criteria for a time during which the image segments are displayed based on a depth range.

The processor 2400 may generate a plurality of reference images corresponding to preset time periods. The time periods may include ranges of hours in a day, and may be classified into generalized time periods. The processor 2400 may generate, for example, a reference image corresponding to morning, a reference image corresponding to afternoon, a reference image corresponding to evening, and a reference image corresponding to night, by changing colors of the image. The processor 2400 may generate color change path information indicating color change paths between the plurality of reference images.

The processor 2400 may provide the object recognition information, the space information, the plurality of weather texture images, the simulation criteria information, the image from which the weather objects are deleted, the plurality of reference images, and the color change path information to the device 1000.

Figure 32:
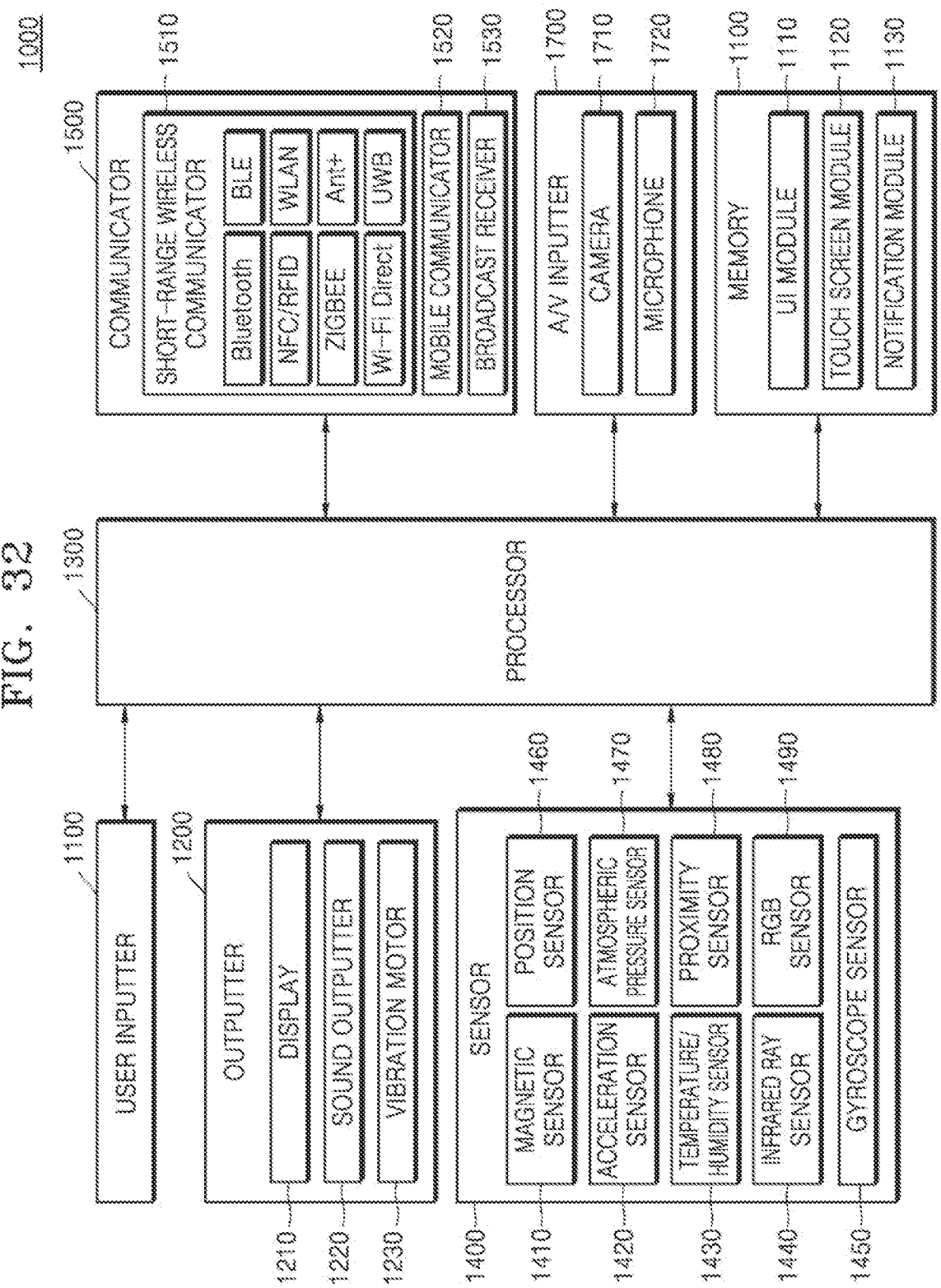
FIG. 32 is a block diagram of a device according to an embodiment of the disclosure.

FIG. 32 is a block diagram of the device 1000 according to an embodiment of the disclosure.

As illustrated in FIG. 32, the device 1000 may include a user inputter 1100, an outputter 1200, a processor 1300, a sensor 1400, a communicator 1500, an audio/video (A/V) inputter 1600, and a memory 1700.

The user inputter 1100 refers to a means used by a user to input data for controlling the device 1000. For example, the user inputter 1100 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto.

The user inputter 1100 may receive a user input for simulating a weather effect in an image.

The outputter 1200 may output audio signals, video signals, or vibration signals and may include a display 1210, a sound outputter 1220, and a vibration motor 1230.

The display 1210 displays information processed by the device 1000. For example, the display 1210 may display a GUI for simulating a weather effect in an image.

When the display 1210 and a touchpad are layered to configure a touchscreen, the display 1210 may be used as an output device and also as an input device. The display 1210 may include at least one of a liquid crystal display (LCD), a thin film transistor-LCD (TFT-LCD), an organic light-emitting diode (OLED), a flexible display, a 3D display, or an electrophoretic display.

The sound outputter 1220 outputs audio data received from the communicator 1500 or stored in the memory 1700. The vibration motor 1230 may output vibration signals to generate a haptic effect.

The processor 1300 generally controls overall operations of the device 1000. For example, the processor 1300 may control the user inputter 1100, the outputter 1200, the sensor 1400, the communicator 1500, and the A/V inputter 1600 by executing programs stored in the memory 1700. The processor 2400 may perform operations of the device 1000 described herein by controlling the user inputter 1100, the outputter 1200, the sensor 1400, the communicator 1500, and the A/V inputter 1600.

Specifically, the processor 1300 may select an image. The processor 1300 may display a GUI for selecting an image to be displayed on a screen in an ambient mode, and select an image based on a user input received through the displayed GUI.

The processor 1300 may transmit the image to the server 2000. The processor 1300 may provide the image to the server 2000 and request the server 2000 to provide data required to simulate a weather effect in the image.

The processor 1300 may receive object recognition information, space information, a plurality of weather texture images, simulation criteria information, an image from which weather objects are deleted, a plurality of reference images, and color change path information from the server 2000.

The processor 1300 may identify current weather and obtain weather texture images corresponding to the current weather. The processor 1300 may select weather texture images corresponding to properties of the current weather, from among the plurality of weather texture images received from the server 2000. The processor 1300 may select the weather texture images based on the properties of the current weather and depths of spaces in the image. The processor 1300 may simulate a weather effect indicating the current weather, in the image by using the selected weather texture images. The processor 1300 may obtain image segments from the selected weather texture images. The processor 1300 may provide the weather effect in the image by sequentially and iteratively overlapping the image segments on the image in a preset cycle.

The processor 1300 may simulate the weather effect in the image, based on the simulation criteria information. The processor 1300 may identify locations of image segments and intervals between the image segments according to the properties of the current weather, based on criteria information for simulating the weather effect. The processor 1300 may select a plurality of image segments from the weather texture images, based on the identified cutting locations and intervals. The processor 1300 may identify simulation cycles according to the properties of the current weather and depth ranges, based on the criteria information for simulating the weather effect. The processor 1300 may simulate image segments corresponding to a first depth range and image segments corresponding to a second depth range, in the image. The processor 1300 may overlap one of a plurality of image segments corresponding to the first depth range and one of a plurality of image segments corresponding to the second depth range, together on the image.

The processor 1300 may simulate the weather effect in the image from which the weather objects are deleted.

The processor 1300 may simulate the weather effect in a reference image corresponding to a current time. The processor 1300 may select the reference image corresponding to the current time, from among the reference images received from the server 2000. The processor 1300 may simulate the weather effect in the selected reference image.

The processor 1300 may change colors of the selected reference image, based on the color change path information. For example, the processor 1300 may gradually change colors of a reference image corresponding to the afternoon, based on the color change path information between the reference image corresponding to afternoon and a reference image corresponding to evening. The processor 1300 may simulate the weather effect in the color-changed reference image.

The sensor 1400 may detect a state of the device 1000 or a state in the vicinity of the device 1000, and transmit detected information to the processor 1300.

The sensor 1400 may include at least one of a magnetic sensor 1410, an acceleration sensor 1420, a temperature/humidity sensor 1430, an infrared sensor 1440, a gyroscope sensor 1450, a location sensor (e.g., a GPS) 1460, a barometric pressure sensor 1470, a proximity sensor 1480, or an RGB sensor (or an illuminance sensor) 1490, but is not limited thereto. Functions of the sensors may be understood from their names by one of ordinary skill in the art, and thus a detailed description thereof is not provided herein.

The communicator 1500 may include one or more elements for communicating with the server 2000. For example, the communicator 1500 may include a short-range wireless communicator 1510, a mobile communicator 1520, and a broadcast receiver 1530.

The short-range wireless communicator 1510 may include, for example, a Bluetooth communicator, a Bluetooth low energy (BLE) communicator, a near field communicator, a wireless local area network (WLAN) (or Wi-Fi) communicator, a Zigbee communicator, an infrared data association (IrDA) communicator, a Wi-Fi direct (WFD) communicator, an ultra-wideband (UWB) communicator, and an Ant+ communicator, but is not limited thereto.

The mobile communicator 1520 transmits and receives radio signals to and from at least one of a base station, an external terminal device, or a server in a mobile communication network. Herein, the radio signals may include various types of data based on transmission and reception of voice call signals, video call signals, or text/multimedia messages.

The broadcast receiver 1530 receives broadcast signals and/or broadcast-related information through broadcast channels from an external source. The broadcast channels may include satellite channels and terrestrial channels. Depending on implementation, the device 1000 may not include the broadcast receiver 1530.

The communicator 1500 may transmit and receive information required to simulate the weather effect in the image, to and from the server 2000.

The A/V inputter 1600 is used to input audio signals or video signals and may include a camera 1610 and a microphone 1620. The camera 1610 may obtain image frames such as still images or moving images through an image sensor in a video call mode or an image capturing mode. The images captured through the image sensor may be processed through the processor 1300 or a separate image processor.

The image frames processed by the camera 1610 may be stored in the memory 1700 or transmitted outside through the communicator 1500. Depending on implementation of the device 1000, two or more cameras 1610 may be included.

The microphone 1620 receives an external sound signal and processes the same into electrical voice data. For example, the microphone 1620 may receive a sound signal from an external device or a user. The microphone 1620 may use various noise cancellation algorithms to cancel noise occurring when the external sound signal is received.

The memory 1700 may store programs for processing and control operations of the processor 1300 and store data input to or to be output from the device 1000.

The memory 1700 may include at least one type of a storage medium from among flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, and an optical disc.

The programs stored in the memory 1700 may be categorized into a plurality of modules, e.g., a user interface (UI) module 1710, a touchscreen module 1720, and a notification module 1730, based on functions thereof.

The UI module 1710 may provide, for example, a specialized UI or GUI connected to the device 1000, per application. The touchscreen module 1720 may detect a touch gesture of a user on a touchscreen and transmit information about the touch gesture to the processor 1300. The touchscreen module 1720 according to an embodiment of the disclosure may recognize and analyze touch code. The touchscreen module 1720 may be implemented as separate hardware including a controller.

The notification module 1730 may generate a signal for giving a notification of an event of the device 1000.

The device 1000 may perform some or all functions of the server 2000 described herein. For example, the device 1000 may perform a function of generating the space information based on the image, a function of generating the object recognition information based on the image, and a function of setting the criteria for simulating the weather effect. In addition, the device 1000 may store various types of information required to simulate the weather effect, e.g., the space information, the object recognition information, the criteria information, and the weather texture images. In this case, the device 1000 may be a high-performance device.

Figure 33:
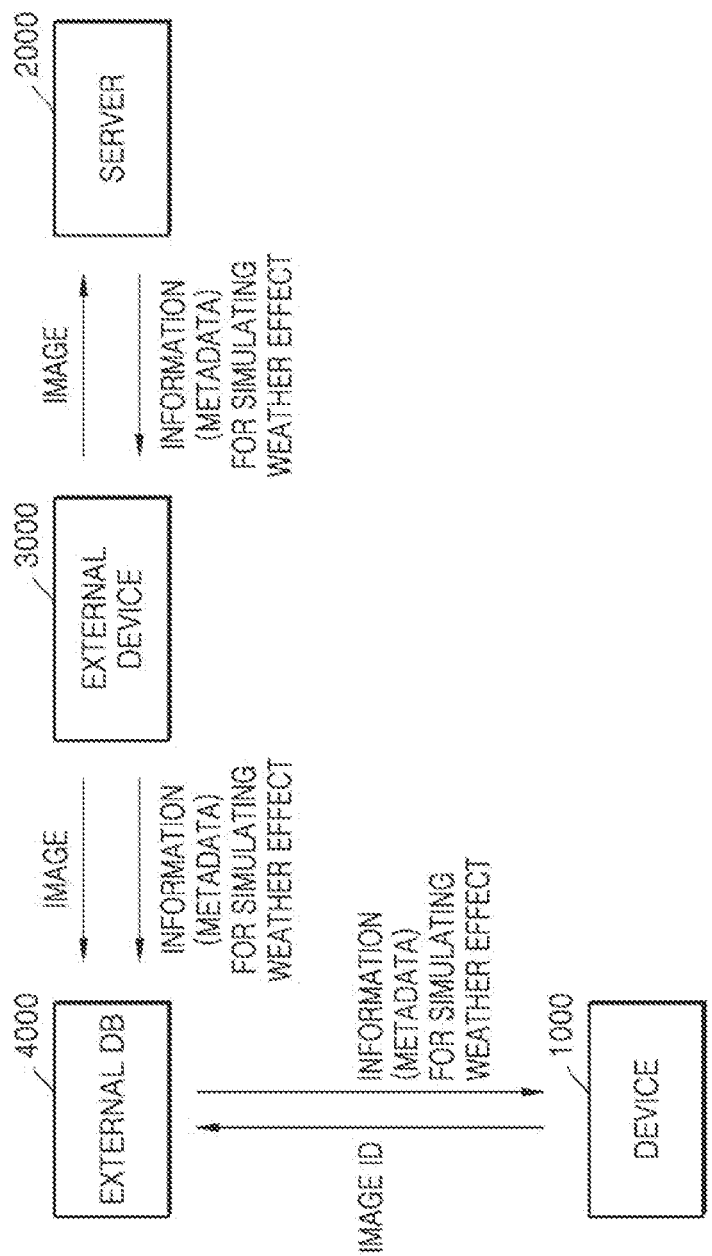
FIG. 33 is a schematic diagram illustrating an example in which an external device sets criteria for simulating a weather effect and a device receives information about the set criteria through an external database (DB) and provides the weather effect in an image, according to an embodiment of the disclosure.

FIG. 33 is a schematic diagram illustrating an example in which an external device 3000 sets criteria for simulating a weather effect and the device 1000 receives information about the set criteria through an external DB 4000 and provides the weather effect in an image, according to an embodiment of the disclosure.

Referring to FIG. 33, the external device 3000 may set criteria for simulating a weather effect in an image, through the server 2000, and the device 1000 may receive information required to simulate the weather effect, from the external DB 4000 to simulate the weather effect in the image.

The external device 3000 may provide the image to which the weather effect is to be applied, to the server 2000 and set the criteria for simulating the weather effect, through a specific GUI displayed on a screen of the external device 3000. For example, the external device 3000 may set the criteria for simulating the weather effect, through the GUI 20 illustrated in FIG. 20. The external device 3000 may not provide the image to the server 2000 and may select an image stored in the server 2000.

The server 2000 may generate information for simulating the weather effect, based on setting values input by the external device 3000 through the GUI. The information for simulating the weather effect may include, for example, images, processed images, weather texture images, space information, object recognition information, and criteria information, but the information for simulating the weather effect is not limited thereto. The information for simulating the weather effect may include the parameter information described above in relation to FIG. 19.

The external device 3000 may provide the image to the server 2000 on a web basis, and receive the information for simulating the weather effect in the image, from the server 2000. The information for simulating the weather effect may be data of a metadata format.

The external device 3000 may provide the image and the information for simulating the weather effect, which are received from the server 2000, to the external DB 4000, and the external DB 4000 may store the image and the information for simulating the weather effect.

The device 1000 may provide an image ID to the external DB 4000 and request the information for simulating the weather effect, and receive the image and the information for simulating the weather effect, from the external DB 4000. The device 1000 may provide the weather effect in the image based on preset criteria by using the information for simulating the weather effect.

The external device 3000 may be, for example, a smartphone, a tablet PC, a PC, a smart TV, a mobile phone, a PDA, a laptop, a media player, a microserver, a GPS device, an e-book reader, a digital broadcast receiver, a navigation system, a kiosk, an MP3 player, a digital camera, a home appliance, or another mobile or non-mobile computing device, but is not limited thereto. The external device 3000 may include the elements of FIG. 32, but is not limited thereto.

The external DB 4000 may be a server for storing and managing the information for simulating the weather effect.

Figure 34:
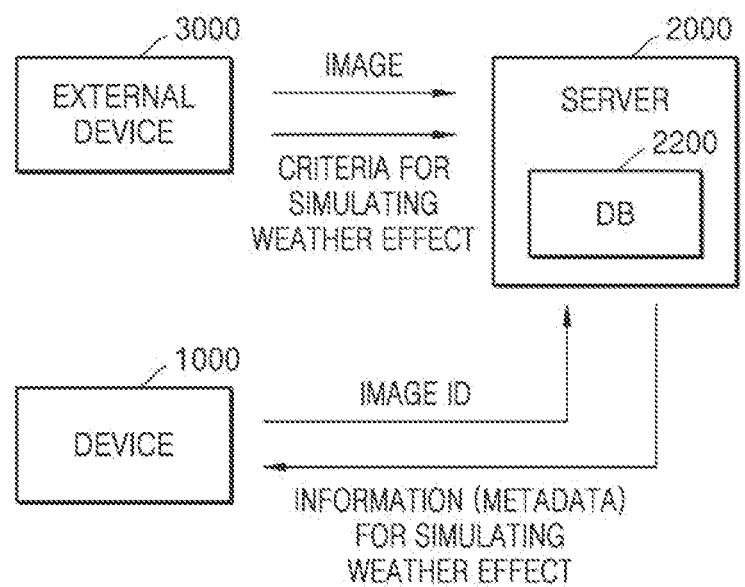
FIG. 34 is a schematic diagram illustrating an example in which an external device sets criteria for simulating a weather effect and a device receives information about the set criteria through a server and provides the weather effect in an image, according to an embodiment of the disclosure.

FIG. 34 is a schematic diagram illustrating an example in which the external device 3000 sets criteria for simulating a weather effect and the device 1000 receives information about the set criteria through the server 2000 and provides the weather effect in an image, according to an embodiment of the disclosure.

The external device 3000 may provide an image to which a weather effect is to be applied, to the server 2000 and set criteria for simulating the weather effect, through a specific GUI displayed on a screen of the external device 3000. For example, the external device 3000 may set the criteria for simulating the weather effect, through the GUI 20 illustrated in FIG. 20. The external device 3000 may not provide the image to the server 2000 and may select an image stored in the server 2000.

The server 2000 may generate information for simulating the weather effect, based on setting values input by the external device 3000 through the GUI. The information for simulating the weather effect may include, for example, images, processed images, weather texture images, space information, object recognition information, and criteria information, but the information for simulating the weather effect is not limited thereto. The information for simulating the weather effect may include the parameter information described above in relation to FIG. 19. The server 2000 may store the image and the information for simulating the weather effect.

The device 1000 may provide an image ID to the server 2000 and request the information for simulating the weather effect, and receive the image and the information for simulating the weather effect, from the server 2000. The device 1000 may provide the weather effect in the image based on preset criteria by using the information for simulating the weather effect.

Figure 35:
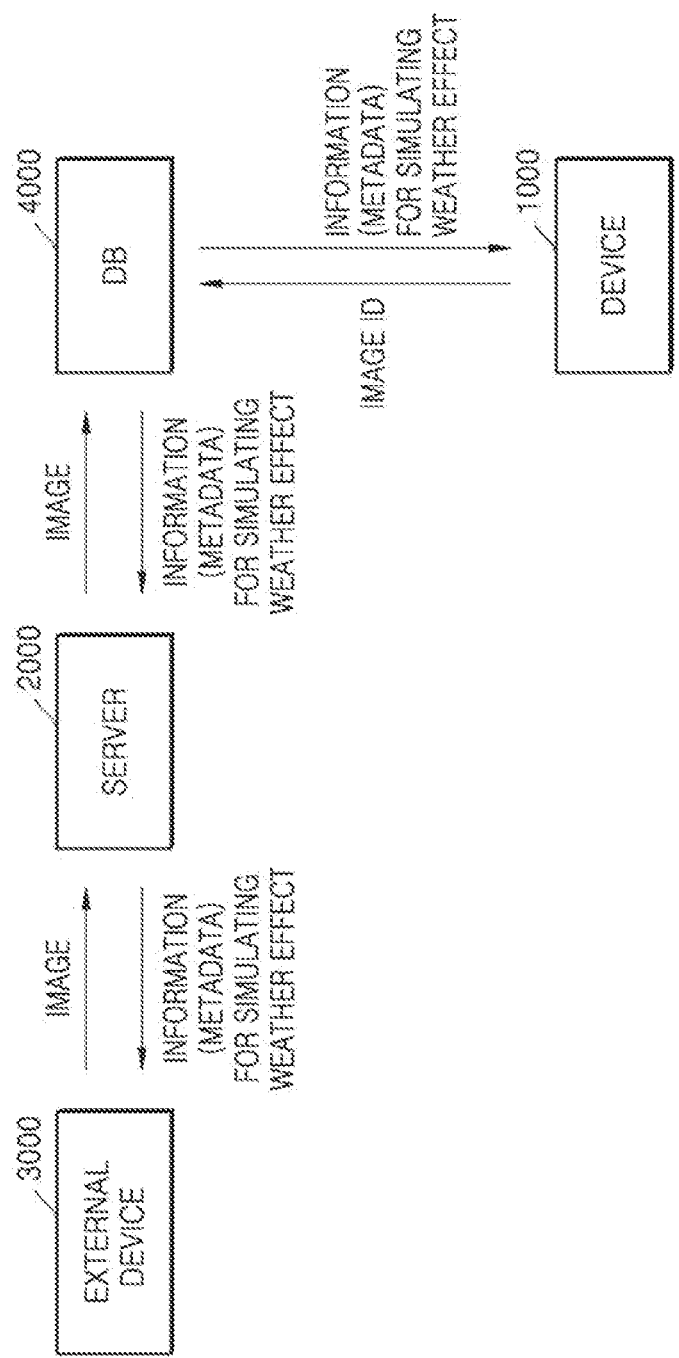
FIG. 35 is a schematic diagram illustrating an example in which an external device sets, through a server, criteria for simulating a weather effect, and a device receives information about the set criteria through an external DB and provides the weather effect in an image, according to an embodiment of the disclosure.

FIG. 35 is a schematic diagram illustrating an example in which the external device 3000 sets, through the server 2000, criteria for simulating a weather effect, and the device 1000 receives information about the criteria through the external DB 4000 and provides the weather effect in an image, according to an embodiment of the disclosure.

The external device 3000 may provide an image to which a weather effect is to be applied, to the server 2000 and set criteria for simulating the weather effect, through a specific GUI displayed on a screen of the external device 3000. For example, the external device 3000 may set the criteria for simulating the weather effect, through the GUI 20 illustrated in FIG. 20. The external device 3000 may not provide the image to the server 2000 and may select an image stored in the server 2000.

The server 2000 may generate information for simulating the weather effect, based on setting values input by the external device 3000 through the GUI. The information for simulating the weather effect may include, for example, images, processed images, weather texture images, space information, object recognition information, and criteria information, but is not limited thereto. The information for simulating the weather effect may include the parameter information described above in relation to FIG. 19.

The server 2000 may provide the image and the information for simulating the weather effect, to the external DB 4000, and the external DB 4000 may store the image and the information for simulating the weather effect.

The device 1000 may provide an image ID to the external DB 4000 and request the information for simulating the weather effect, and receive the image and the information for simulating the weather effect, from the external DB 4000. The device 1000 may provide the weather effect in the image based on preset criteria by using the information for simulating the weather effect.

An embodiment of the disclosure may be implemented in the form of a computer-readable recording medium including instructions executable by a computer, e.g., a program module executed by a computer. The computer-readable recording medium may be an arbitrary available medium accessible by a computer, and examples thereof include all of volatile, non-volatile, detachable, and non-detachable media. The computer-readable recording medium may include a computer storage medium and a communication medium. Examples of the computer storage medium include all of volatile, non-volatile, detachable, and non-detachable media implemented using an arbitrary method or technology for storing information such as computer-readable instructions, data structures, program modules, or other data. Examples of the communication medium may typically include computer-readable instructions, data structures, and other data of modulated data signals such as program modules.

As used herein, a suffix "unit" or "-er/or" may indicate a hardware component such as a processor or a circuit, and/or a software component executed by the hardware component such as the processor.

Throughout the disclosure, the expression "at least one of a, b or c" indicates only a, only b, only c, both a and b, both a and c, both b and c, all of a, b, and c, or variations thereof.

The above descriptions of the disclosure are provided for the purpose of illustration, and it will be understood by one of ordinary skill in the art that various changes in form and details may be made therein without departing from the scope of the disclosure. Therefore, it should be understood that embodiments of the disclosure described herein should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

What is claimed is:

1. A method of a device providing a weather effect in an image, the method comprising:
   obtaining an input image to which the weather effect is to be applied;
   recognizing a first object in the input image;
   identifying a current time and a current weather condition corresponding to the device;
   selecting a first weather effect image based on the current time and the current weather condition, wherein the first weather effect image comprises a second object associated with the weather effect;
   obtaining a second weather effect image in which the second object is modified; and
   based on a relationship between the first object and the second object, generating an output image to which the weather effect is applied according to the current time and the current weather condition using the input image, the first weather effect image, and the second weather effect image to simulate a physical interaction between the first object and the second object by sequentially overlapping a plurality of first image segments included in the first weather effect image and a plurality of second image segments included in the second weather effect image on the first object.

2. The method of claim 1, wherein the recognizing the first object in the input image comprises:
obtaining object recognition information about a shape of the first object in the input image and space information about a depth of the first object in the input image.

3. The method of claim 2, wherein a plurality of objects are in the input image, and
wherein the weather effect comprises a visual effect caused when two objects among the plurality of objects collide, by using the space information.

4. The method of claim 2, further comprising:
receiving, from a server, the object recognition information and the space information,
wherein the object recognition information is generated by the server by applying the input image as input to a second artificial intelligence model, and
wherein the space information is generated by the server by applying the input image as input to a third artificial intelligence model.

5. The method of claim 2, wherein the obtaining of the input image comprises receiving, from a server, the input image from which weather objects indicating the weather effect are deleted by the server.

6. The method of claim 2, wherein the obtaining of the input image comprises receiving, from a server, reference images corresponding to preset time periods.

7. The method of claim 1, wherein the current weather condition corresponds to a location of the device.

8. The method of claim 1, wherein the generating the output image comprises:
generating the output image using a first artificial intelligence model to include the weather effect in the input image.

9. The method of claim 1, wherein the relationship comprises a spatial relationship between the first object and the second object, and
wherein at least one of a location and an appearance of the second object in the output image is determined based on the spatial relationship.

10. The method of claim 1, wherein intervals between areas corresponding to the plurality of first image segments in the first weather effect image are determined based on the current weather condition.

11. A non-transitory computer-readable recording medium having recorded thereon a computer program for execution by a processor to perform the method of claim 1.

12. A device for providing a weather effect in an image, the device comprising:
a display;
a memory storing one or more instructions; and
a processor configured to execute the one or more instructions to:
obtain an input image to which the weather effect is to be applied, recognize a first object in the input image,
identify a current time and a current weather condition corresponding to the device,
select a first weather effect image based on the current time and the current weather condition, wherein the first weather effect image comprises a second object associated with the weather effect,
obtain a second weather effect image in which the second object is modified, and
based on a relationship between the first object and the second object, generate an output image to which the weather effect is applied according to the current time and the current weather condition using the input image, the first weather effect image, and the second weather effect image to simulate a physical interaction between the first object and the second object by sequentially overlapping a plurality of first image segments included in the first weather effect image and a plurality of second image segments included in the second weather effect image on the first object.

13. The device of claim 12, wherein the processor is further configured to execute the one or more instructions to: obtain object recognition information about a shape of the first object in the input image and space information about a depth of the first object in the input image.

14. The device of claim 13, wherein a plurality of objects are in the input image, and
wherein the weather effect comprises a visual effect caused when two objects among the plurality of objects collide, by using the space information.

15. The device of claim 13, wherein the processor is further configured to execute the one or more instructions to: receive, from a server, the object recognition information and the space information,
wherein the object recognition information is generated by the server by applying the input image as input to a second artificial intelligence model, and
wherein the space information is generated by the server by applying the input image as input to a third artificial intelligence model.

16. The device of claim 12, wherein the current weather condition corresponds to a location of the device.

17. The device of claim 12, wherein the processor is further configured to execute the one or more instructions to: generate the output image using a first artificial intelligence model to include the weather effect in the input image.

* * * * *